(12) United States Patent
Okazawa et al.

(10) Patent No.: US 12,552,174 B2
(45) Date of Patent: Feb. 17, 2026

(54) LIQUID EJECTING HEAD, LIQUID EJECTING APPARATUS, AND FILTER MEMBER

(71) Applicant: SEIKO EPSON CORPORATION, Tokyo (JP)

(72) Inventors: Noriaki Okazawa, Shiojiri (JP); Hidenori Sokabe, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 264 days.

(21) Appl. No.: 18/522,323

(22) Filed: Nov. 29, 2023

(65) Prior Publication Data
US 2024/0173988 A1 May 30, 2024

(30) Foreign Application Priority Data

Nov. 30, 2022 (JP) ................................. 2022-192449

(51) Int. Cl.
*B41J 2/175* (2006.01)
*B41J 2/14* (2006.01)

(52) U.S. Cl.
CPC ............ *B41J 2/17563* (2013.01); *B41J 2/14* (2013.01); *B41J 2/14233* (2013.01); *B41J 2002/14362* (2013.01); *B41J 2002/14403* (2013.01); *B41J 2002/14419* (2013.01)

(58) Field of Classification Search
CPC ...... B41J 2/17563; B41J 2/14; B41J 2/14233; B41J 2002/14362; B41J 2002/14403; B41J 2002/14419; B01D 29/111; B01D 2201/0407; B01D 2239/065; B01D 2239/0654; B01D 29/58

See application file for complete search history.

(56) References Cited

U.S. PATENT DOCUMENTS 8,714,722 B2 * 5/2014 Hays .................... B41J 2/17563
347/92

FOREIGN PATENT DOCUMENTS

JP 2008-018662 A 1/2008

* cited by examiner

*Primary Examiner* — Geoffrey S Mruk
(74) *Attorney, Agent, or Firm* — Harness, Dickey & Pierce, P.L.C.

(57) ABSTRACT

A filter member including filter plates laminated in a first direction and having filter holes is included. The filter member includes a first filter plate at which a first through-hole is formed and a second filter plate at which a second through-hole is formed. The filter hole includes a penetrating portion that is a portion where a part of the first through-hole overlaps with a part of the second through-hole when viewed in the first direction and that penetrates from a first surface to a second surface, and a first portion adjacent to the penetrating portion and recessed by more than half a thickness of the filter member from a second surface to a first surface when viewed in the first direction.

19 Claims, 15 Drawing Sheets

FIG. 9
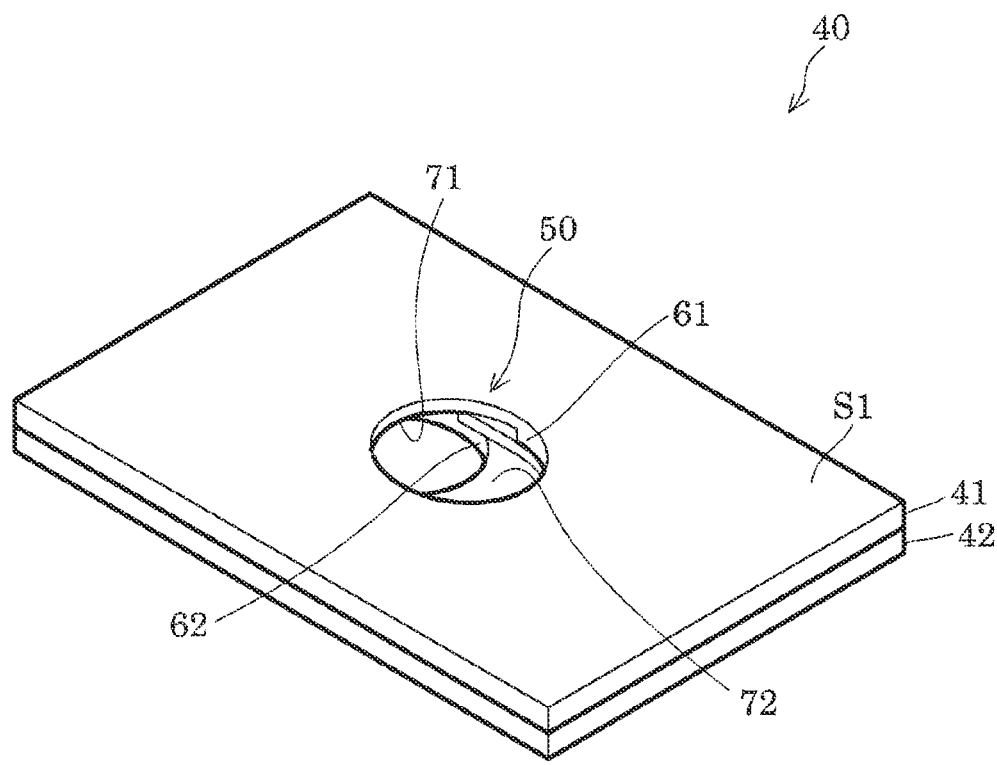
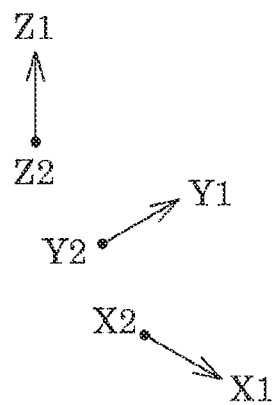

LIQUID EJECTING HEAD, LIQUID EJECTING APPARATUS, AND FILTER MEMBER

The present application is based on, and claims priority from JP Application Serial Number 2022-192449, filed Nov. 30, 2022, the disclosure of which is hereby incorporated by reference herein in its entirety.

BACKGROUND

1. Technical Field

The present disclosure relates to a liquid ejecting head which ejects a liquid, a liquid ejecting apparatus, and a filter member which removes foreign substances in the liquid.

2. Related Art

A liquid ejecting apparatus represented by an ink jet recording apparatus such as a printer or a plotter includes a liquid ejecting head such as an ink jet recording head which ejects ink. For example, JP-A-2008-18662 discloses an ink jet recording head including a filter member formed by laminating a plurality of filter plates (vibration plates) in which a plurality of through-holes are formed. Through-holes formed in each of the laminated filter plates partially overlap each other in order to make the mesh of the filter member finer and to capture small foreign substances.

However, the liquid ejecting head according to JP-A-2008-18662 has a problem that the flow path resistance increases and the pressure loss of the liquid flowing through the filter member increases by making the mesh of the filter member finer. Such a problem exists similarly in a liquid ejecting head that ejects a liquid other than ink, the liquid ejecting apparatus, and the filter member that circulates the foreign substances in the liquid other than ink.

SUMMARY

According to an aspect of the present disclosure, there is provided a liquid ejecting head including a nozzle that ejects a liquid, and a filter member including a plurality of filter plates laminated in a first direction and having a plurality of filter holes through which a liquid supplied to the nozzle passes, in which the filter member includes a first surface and a second surface facing opposite directions with respect to the first direction, the plurality of filter plates include a first filter plate at which a first through-hole is formed and defining the first surface, and a second filter plate at which a second through-hole is formed and defining the second surface, and the filter hole includes a penetrating portion that is a portion where a part of the first through-hole overlaps with a part of the second through-hole when viewed in the first direction, and that penetrates from the first surface to the second surface, and a first portion adjacent to the penetrating portion and recessed by more than half a thickness of the filter member from the second surface to the first surface when viewed in the first direction.

In addition, according to another aspect of the present disclosure, there is provided a liquid ejecting apparatus including a liquid ejecting head having a nozzle that ejects a liquid, and a filter member including a plurality of filter plates laminated in a first direction and having a plurality of filter holes through which a liquid supplied to the liquid ejecting head passes, in which the filter member includes a first surface and a second surface facing opposite directions with respect to the first direction, the plurality of filter plates include a first filter plate at which a first through-hole is formed and defining the first surface, and a second filter plate at which a second through-hole is formed and defining the second surface, and the filter hole includes a penetrating portion that is a portion where a part of the first through-hole overlaps with a part of the second through-hole when viewed in the first direction, and that penetrates from the first surface to the second surface, and a first portion adjacent to the penetrating portion and recessed by more than half a thickness of the filter member from the second surface to the first surface when viewed in the first direction.

In addition, according to still another aspect of the present disclosure, there is provided a filter member including a plurality of filter plates laminated in a first direction and a plurality of filter holes through which a liquid passes, in which the filter member includes a first surface and a second surface facing opposite directions with respect to the first direction, the plurality of filter plates include a first filter plate at which a first through-hole is formed and defining the first surface, and a second filter plate at which a second through-hole is formed and defining the second surface, and the filter hole includes a penetrating portion that is a portion where a part of the first through-hole overlaps with a part of the second through-hole when viewed in the first direction, and that penetrates from the first surface to the second surface, and a first portion adjacent to the penetrating portion and recessed by more than half a thickness of the filter member from the second surface to the first surface when viewed in the first direction.

BRIEF DESCRIPTION OF THE DRAWINGS

FIG. 9 is a perspective view illustrating a state after bonding the first filter plate and the second filter plate constituting the filter member according to the second embodiment.

DESCRIPTION OF EMBODIMENTS

Hereinafter, the present disclosure will be described in detail based on embodiments. However, the following description illustrates an aspect of the present disclosure, and can be randomly changed within the scope of the present disclosure.

In each of the drawings, X, Y, and Z represent three spatial axes that are orthogonal to each other. The positive direction and the negative direction are not limited, and the directions along the three axes are defined as an X direction, a Y direction, and a Z direction. The directions to which the arrows in each drawing are directed are defined as an X1 direction, a Y1 direction, and a Z1 direction, and the directions opposite to the arrows are defined as an X2 direction, a Y2 direction, and a Z2 direction. The Y direction (Y1 direction and Y2 direction) corresponds to a transport direction of a medium. The Z2 direction is downward in a vertical direction, and the Z1 direction is upward in the vertical direction. The Z direction does not need to be the vertical direction. Furthermore, although the X axis, the Y axis, and the Z axis are orthogonal to each other, the axes are not limited thereto and may intersect at an angle within the range of, for example, 80 degrees or more and 100 degrees or less.

First Embodiment

Figure 1:
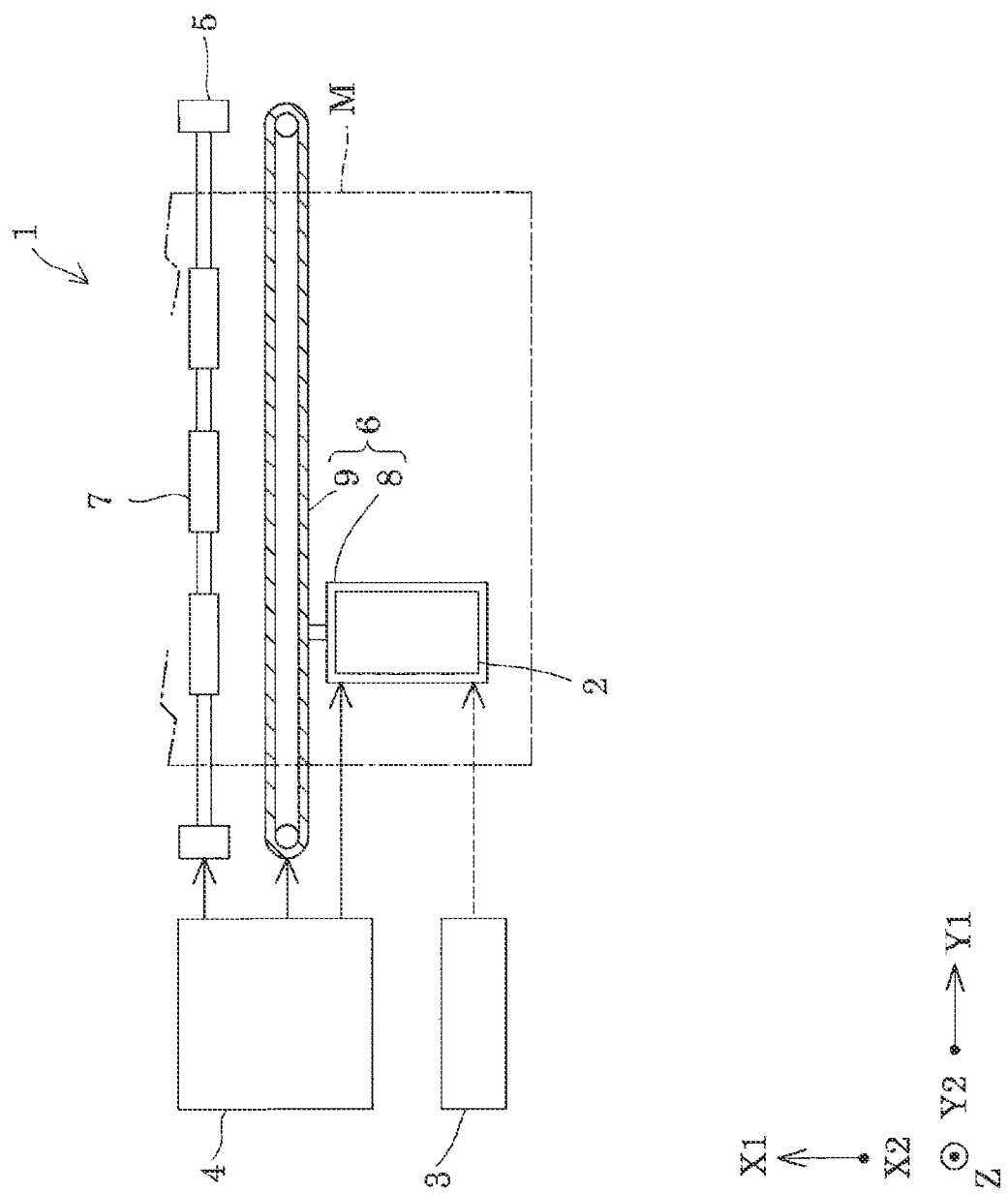
FIG. 1 is a schematic view of an ink jet recording apparatus according to a first embodiment.

An ink jet recording apparatus (hereinafter, simply referred to as "recording apparatus") 1 illustrated in FIG. 1 is an example of a liquid ejecting apparatus, and is a printing apparatus that ejects and lands ink, which is a type of liquid, as ink droplets on a medium M such as printing paper, and that prints an image or the like by an arrangement of dots formed at the medium M. As the medium M, any material such as a resin film or cloth can be used in addition to the printing paper.

The recording apparatus 1 includes an ink jet recording head 2 (hereinafter, also simply referred to as "recording head 2"), a liquid container 3, a control section 4, a transport mechanism 5 that feeds out the medium M, and a moving mechanism 6.

The recording head 2 is an example of a liquid ejecting head, and ejects ink supplied from the liquid container 3 onto the medium M from a plurality of nozzles. The detailed configuration of the recording head 2 will be described later.

The liquid container 3 is an example of a liquid storage section that stores liquid, and individually stores a plurality of types (for example, a plurality of colors) of ink ejected from the recording head 2. Examples of the liquid storage section include a cartridge that can be attached to and detached from the recording apparatus 1, a bag-shaped ink pack made of a flexible film, an ink tank that can be refilled with ink.

The control section 4 includes, for example, a control device such as a central processing unit (CPU) or a field programmable gate array (FPGA), and a storage device such as a semiconductor memory. The control section 4 collectively controls each element of the recording apparatus 1, that is, the recording head 2, the transport mechanism 5, the moving mechanism 6, and the like, by executing a program stored in the storage device by a control device.

The transport mechanism 5 is a mechanism transporting the medium M in the X direction. Specifically, the transport mechanism 5 has a transport roller 7 and transports the medium M in the X direction by the rotation of the transport roller 7. The transport mechanism 5 transporting the medium M is not limited to a mechanism including the transport roller 7, but may be a mechanism transporting the medium M by a belt or a drum, for example.

The moving mechanism 6 is a mechanism for reciprocating the recording head 2 along the Y direction, and includes a transport body 8 and a transport belt 9. The transport body 8 is a substantially box-shaped structure for accommodating the recording head 2, a so-called carriage, and is fixed to the transport belt 9. The transport belt 9 is an endless belt erected along the Y direction. The recording head 2 reciprocates together with the transport body 8 in the Y direction by the rotation of the transport belt 9 under the control of the control section 4. The transport body 8 may have a configuration in which the recording head 2 and the liquid container 3 are mounted.

Under the control of the control section 4, the recording head 2 performs an ejection operation of ejecting ink supplied from the liquid container 3 from each of the plurality of nozzles as ink droplets onto the medium M in the Z2 direction. The ejection operation by the recording head 2 is performed in parallel with the transporting of the medium M by the transport mechanism 5 and the reciprocating movement of the recording head 2 by the moving mechanism 6, so that so-called printing in which an image is formed by ink on the surface of the medium M is performed.

Figure 2:
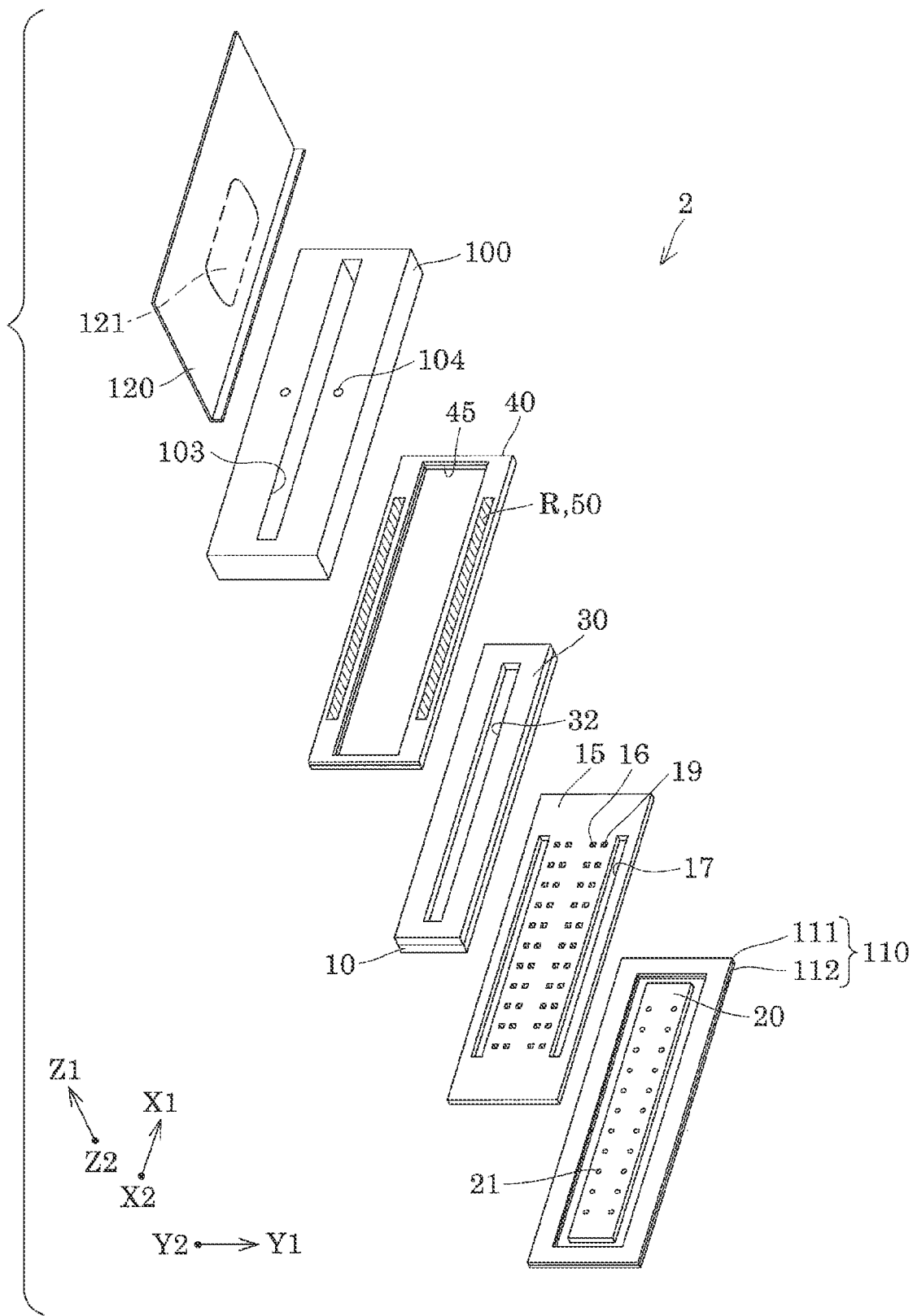
FIG. 2 is an exploded perspective view of a recording head according to the first embodiment.
Figure 3:
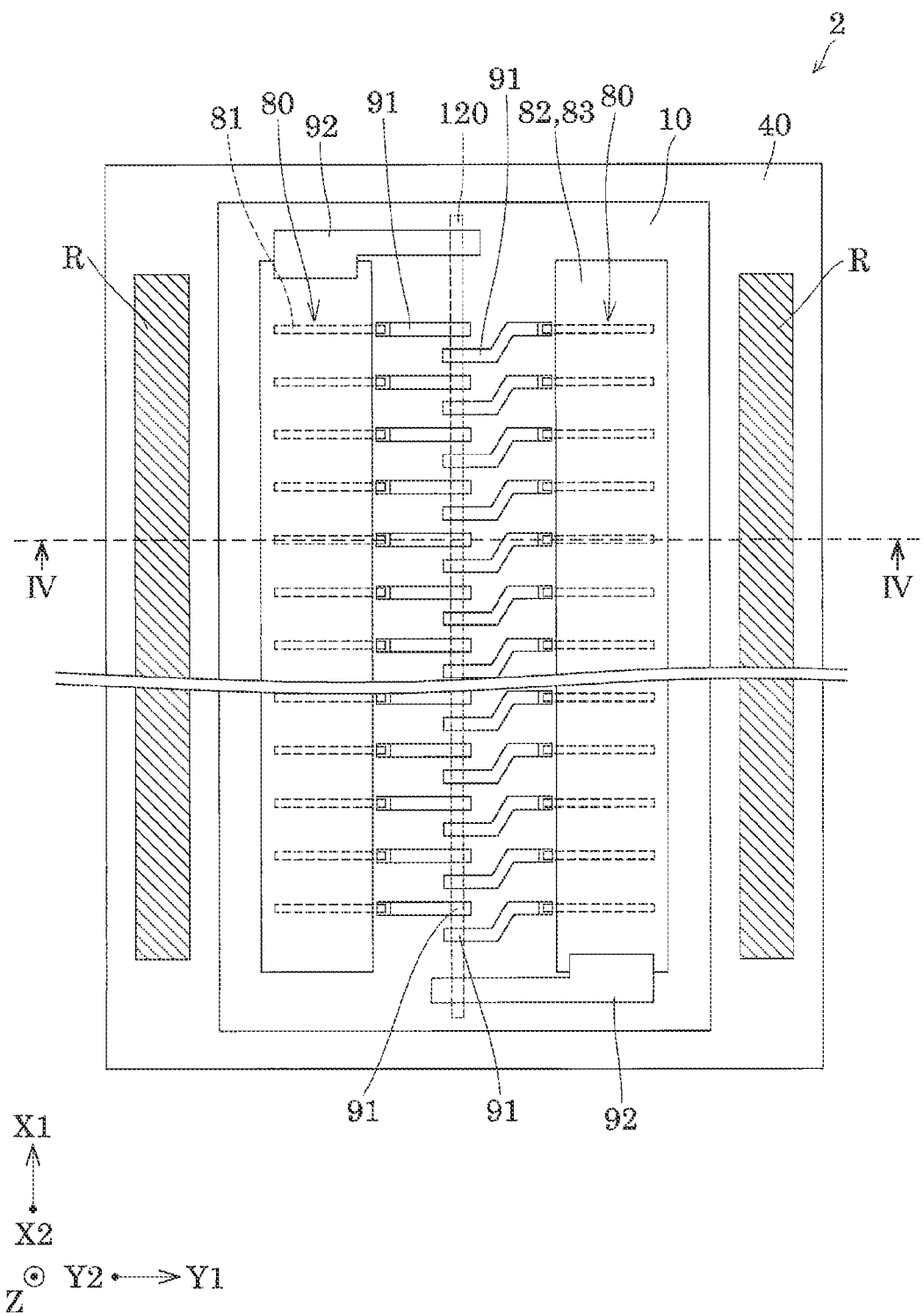
FIG. 3 is a plan view of the recording head according to the first embodiment.
Figure 4:
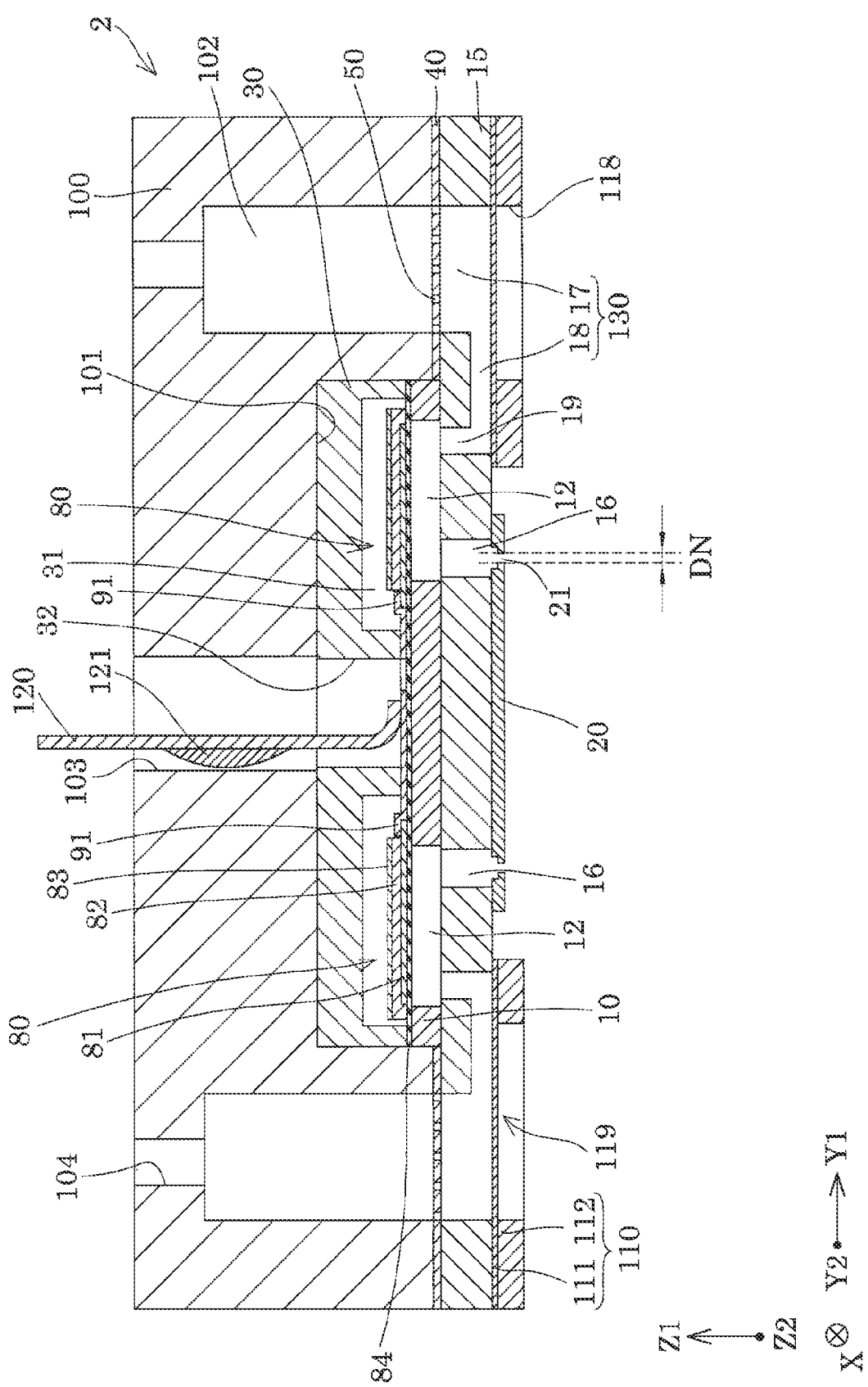
FIG. 4 is a cross-sectional view of the recording head according to the first embodiment.

The recording head 2 will be described with reference to FIGS. 2 to 4. FIG. 2 is an exploded perspective view of the recording head 2, FIG. 3 is a plan view of the recording head 2, and FIG. 4 is a cross-sectional view of the recording head. In FIG. 3, a pressure chamber substrate 10 and a filter member 40 among the elements constituting the recording head 2 are illustrated, and a protective substrate 30 and a case member 100 are not illustrated. FIG. 4 is a view corresponding to line IV-IV in FIG. 3.

As illustrated, the recording head 2 according to the present embodiment includes the pressure chamber substrate 10. The pressure chamber substrate 10 is made of, for example, a silicon substrate, a glass substrate, an SOI substrate, various ceramic substrates, or the like.

On the pressure chamber substrate 10, pressure chambers 12, which are recessed sections opened on the Z2 direction side, are disposed side by side along the X direction. The plurality of pressure chambers 12 are disposed on a straight line along the X direction such that positions in the Y direction are the same. The pressure chambers 12 adjacent to each other in the X direction are partitioned by partition walls which are not illustrated. In the present embodiment, the pressure chambers 12 are disposed side by side to form a row in the X direction. TWO rows of pressure chambers including the plurality of pressure chambers 12 arranged in a row are provided in the Y direction. The plurality of pressure chambers 12 in each row are disposed such that positions in the Y direction are the same position. The disposition of the pressure chamber 12 is not particularly limited. For example, the disposition of the plurality of pressure chambers 12 arranged in the X direction may be a so-called staggered disposition in which the respective pressure chambers 12 are disposed at positions shifted in the Y direction for every other pressure chamber 12.

The pressure chamber 12 is formed in a rectangular shape in which a length in the Y direction is longer than a length in the X direction in plan view when viewed in the Z direction. Of course, the shape of the pressure chamber 12 is not particularly limited, and may be a parallel quadrilateral shape, a polygonal shape, a circular shape, an oval shape, or the like. The oval shape referred to here refers to a shape in which both end portions in a longitudinal direction are semicircular shapes based on a rectangular shape, and includes a rectangular shape with rounded corners, an elliptical shape, an egg shape, or the like.

A communication plate 15, a nozzle plate 20, and a compliance substrate 110 are sequentially stacked on the Z2 direction side of the pressure chamber substrate 10.

The communication plate 15 is provided with a nozzle communication passage 16 through which the pressure chamber 12 and a nozzle 21 communicate with each other. The communication plate 15 is provided with a first manifold section 17 and a second manifold section 18 that form a part of a manifold 130 that serves as a common liquid chamber with which the plurality of pressure chambers 12 communicate. The first manifold section 17 is provided to penetrate the communication plate 15 in the Z direction. The second manifold section 18 is provided to open on the surface on the Z2 direction side without penetrating the communication plate 15 in the Z direction.

The communication plate 15 is provided with a supply communication passage 19 communicating with one end portion of the pressure chamber 12 in the Y direction independently of each of the pressure chambers 12. The supply communication passage 19 communicates the second manifold section 18 with each of the pressure chambers 12, and supplies ink in the manifold 130 to each pressure chamber 12.

As the communication plate 15, a silicon substrate, a glass substrate, an SOI substrate, various ceramic substrates, a metal substrate, or the like can be used.

The nozzle plate 20 is provided on a surface of the communication plate 15 on the Z2 direction side opposite to the pressure chamber substrate 10. The nozzle plate 20 is formed with the nozzle 21 that communicates with each of the pressure chambers 12 through the nozzle communication passage 16.

The plurality of nozzles 21 are provided corresponding to each pressure chamber 12, and are disposed side by side to form a row along the X direction. Two nozzle rows including the plurality of nozzles 21 arranged in a row are provided in the Y direction. The plurality of nozzles 21 in each row are disposed such that positions in the Y direction are the same position. The disposition of the nozzle 21 is not particularly limited. For example, the nozzles 21 disposed side by side in the X direction may be disposed at positions shifted in the Y direction for every other nozzle 21.

The material of the nozzle plate 20 is not particularly limited, and for example, a silicon substrate, a glass substrate, an SOI substrate, various ceramic substrates, and a metal substrate can be used. Examples of the metal substrate include a stainless steel substrate. Furthermore, as the material of the nozzle plate 20, an organic substance such as a polyimide resin can be used.

The compliance substrate 110, together with the nozzle plate 20, is provided on the surface of the communication plate 15 on the Z2 direction side opposite to the pressure chamber substrate 10. The compliance substrate 110 is provided around the nozzle plate 20 and seals the openings of the first manifold section 17 and the second manifold section 18 provided in the communication plate 15. In the present embodiment, the compliance substrate 110 includes a sealing film 111 made of a flexible thin film and a fixed substrate 112 made of a hard material such as a metal. The region of the fixed substrate 112 facing the manifold 130 is a removal section 118 completely removed in a thickness direction. Accordingly, one surface of the manifold 130 is a compliance section 119 sealed only by the flexible sealing film 111.

A vibration plate 84 and a piezoelectric element 80 are provided on a surface of the pressure chamber substrate 10 on the Z1 direction side. That is, the pressure chamber substrate 10, the vibration plate 84, and the piezoelectric element 80 are stacked in this order from the Z2 direction to the Z1 direction.

The vibration plate 84 is composed of an elastic film provided on the surface of the pressure chamber substrate 10 on the Z1 direction side and an insulator film provided on a surface of the elastic film on the Z1 direction side. The elastic layer is, for example, a film made of silicon oxide ($SiO_2$). Such an elastic film can be made, for example, by thermally oxidizing the surface of the pressure chamber substrate on the Z1 direction side. The insulator film is, for example, a film made of zirconium oxide ($ZrO_2$). Such an insulator film can be made, for example, by forming a layer of zirconium alone by a sputtering method or the like and then thermally oxidizing the layer. The vibration plate is not limited to the one made of an elastic film and an insulator film. For example, one of the elastic film and the insulator film may be provided as the vibration plate. In addition, a first electrode of the piezoelectric element 80, which will be described later, may be used as a vibration plate without providing the elastic film and the insulator film.

The piezoelectric element 80 is formed for each pressure chamber 12. In the present embodiment, since two rows of the plurality of pressure chambers 12 arranged in the X direction are provided in the Y direction, a plurality of piezoelectric elements 80 are also arranged in the X direction to form rows, and two rows of the piezoelectric elements 80 are provided in the Y direction. The piezoelectric element 80 is a pressure generating unit for causing a pressure change in the ink inside the pressure chamber 12, and is also referred to as a piezoelectric actuator. The piezoelectric element 80 includes a first electrode 81, a piezoelectric body layer 83, and a second electrode 82 that are sequentially stacked from the Z2 direction side, which is the vibration plate 84 side, to the Z1 direction side. The piezoelectric element 80 is a portion where piezoelectric strain occurs in the piezoelectric body layer 83 when a voltage is applied between the first electrode 81 and the second electrode 82.

Generally, one of the first electrode 81 and the second electrode 82 is configured as an independent individual electrode for each piezoelectric element 80, and the other is configured as a common electrode common to the plurality of piezoelectric elements 80. In the present embodiment, the first electrode 81 is configured as an individual electrode, and the second electrode 82 is configured as a common electrode.

Specifically, the first electrode 81 constitutes an individual electrode that is separated for each pressure chamber 12 and is independent for each piezoelectric element 80. The first electrode 81 is formed to have a width narrower than a width of the pressure chamber 12 in the X direction. That is, in the X direction, the first electrode 81 is positioned inside the pressure chamber 12.

In the Y direction, an inner end portion of the first electrode 81 extends from the region facing the pressure chamber 12 to the outside of the pressure chamber 12, and an outer end portion of the first electrode 81 is disposed in the region facing the pressure chamber 12. The inner end portion of the first electrode 81 means an end portion on a side close to a region between two rows of the piezoelectric elements 80 in the Y direction. The outer end portion of the first electrode 81 refers to an end portion on a side far from a region between two rows of piezoelectric elements 80 in the Y direction. Specifically, regarding the piezoelectric element 80 on the Y1 side of the two rows of the piezoelectric elements 80 in the Y direction, the inner end portion of the first electrode 81 is an end portion on the Y2 side, and the outer end portion of the first electrode 81 is an end portion on the Y1 side. Regarding the piezoelectric element 80 on the Y2 side of the two rows of piezoelectric elements 80 in the Y direction, the inner end portion of the first electrode 81 is the end portion on the Y1 side, and the outer end portion of the first electrode 81 is the end portion on the Y2 side. It is assumed that the inner and outer end portions of the second electrode 82 and the piezoelectric body layer 83 are the same as those of the first electrode 81.

The material of the first electrode 81 is not particularly limited, and a conductive material can be used. The piezoelectric body layer 83 is continuously provided along the X direction, with a thickness in the Z direction as a predetermined thickness and a length in the Y direction as a predetermined length. That is, the piezoelectric body layer 83 is continuously provided along the direction in which the pressure chambers 12 are arranged. A length of the piezoelectric body layer 83 in the Y direction is longer than a length in the Y direction which is the longitudinal direction of the pressure chamber 12, and the piezoelectric body layer 83 extends to both of the outsides of the pressure chamber 12 in the Y direction.

In the present embodiment, the outer end portion of the piezoelectric body layer 83 is positioned outside the end portion of the first electrode 81. That is, the outer end portion of the first electrode 81 is covered with the piezoelectric body layer 83.

In addition, the inner end portion of the piezoelectric body layer 83 is positioned closer to the pressure chamber 12 than the end portion of the first electrode 81, and the inner end portion of the first electrode 81 is exposed without being covered with the piezoelectric body layer 83.

The piezoelectric body layer 83 is configured by using a piezoelectric material made of a perovskite structure composite oxide represented by the general formula $ABO_3$. Lead zirconate titanate (PZT; $Pb(Zr, Ti)O_3$) can be used as the piezoelectric material. Of course, the piezoelectric material is not limited to lead zirconate titanate, and known materials can be applied.

The second electrode 82 is continuously provided on the Z1 direction side which is opposite side of the first electrode 81 of the piezoelectric body layer 83, and constitutes a common electrode common to the plurality of piezoelectric elements 80. The second electrode 82 is continuously provided along the X direction, with a length in the Y direction as a predetermined length.

The material of the second electrode 82 is not particularly limited, and a precious metal material, a conductive oxide, and the like are used. In addition, the second electrode 82 may be formed by laminating a plurality of materials.

An individual lead electrode 91 is drawn from the first electrode 81, and a common lead electrode 92 is drawn from the second electrode 82. A flexible wiring substrate 120 is coupled to the individual lead electrode 91 and the common lead electrode 92 at an end portion opposite to the piezoelectric element 80. In the present embodiment, the individual lead electrode 91 and the common lead electrode 92 extend to be exposed in a first wiring insertion hole 32 formed in the protective substrate 30, and are electrically coupled to the wiring substrate 120 in the first wiring insertion hole 32. A drive circuit 121 having a switching element for driving the piezoelectric element 80 is mounted on the wiring substrate 120.

Although in the piezoelectric element 80 described above, the first electrode 81 is an individual electrode for each piezoelectric element 80, and the second electrode is a common electrode common to each piezoelectric element 80, the present disclosure is not limited to such a configuration. That is, the first electrode 81 may be the common electrode common to each piezoelectric element 80, and the second electrode may be the individual electrode for each piezoelectric element 80.

The protective substrate 30 having substantially the same size as the pressure chamber substrate 10 is bonded to a surface of the pressure chamber substrate 10 on the Z1 direction side. The protective substrate 30 has a holding section 31 which is a space for protecting the piezoelectric element 80. The holding sections 31 are provided independently for each row of the piezoelectric elements 80 disposed side by side in the X direction, and two holding sections 31 are formed side by side in the Y direction. In addition, the protective substrate 30 is provided with a first wiring insertion hole 32 penetrating in the Z direction between two holding sections 31 disposed side by side in the Y direction.

The filter member 40 is bonded to a surface of the communication plate 15 on the Z1 direction side. In FIGS. 2 and 3, a region R where the filter holes 50 are provided is illustrated only by hatching on the surface of the filter member 40 on the Z1 direction side, and the illustration of the individual filter holes 50 is omitted.

In the present embodiment, an outer shape of the filter member 40 has substantially the same shape as an outer shape of the communication plate 15 in plan view when viewed in the Z2 direction. In addition, the filter member 40 has an opening section 45 in which a region facing the pressure chamber substrate 10 is removed in the Z direction. The filter member 40 is provided on the surface of the communication plate 15 on the Z1 direction side in a state where the pressure chamber substrate 10 is disposed inside the opening section 45.

The filter member 40 is provided with the filter holes 50 in the region R facing the first manifold section 17 in plan view when viewed in the Z2 direction. The detailed configurations of the filter member 40 and the filter hole 50 will be described later.

The case member 100 is fixed to a surface of the filter member 40 on the Z1 direction side. The case member 100 has substantially the same shape as the outer shape of the filter member 40 in plan view when viewed in the Z direction. In addition, the case member 100 includes an accommodation section 101 which is a space having a depth capable of accommodating the pressure chamber substrate 10 and the protective substrate 30. The accommodation section 101 has an opening area wider than the surface of the protective substrate 30 bonded to the pressure chamber substrate 10. The opening surface of the accommodation section 101 on the pressure chamber substrate 10 is sealed by the vibration plate 84 in a state where the pressure chamber substrate 10 and the protective substrate 30 are accommodated in the accommodation section 101. Furthermore, the case member 100 is provided with a second wiring insertion hole 103 that communicates with the first wiring insertion hole 32 of the protective substrate 30 and through which the wiring substrate 120 is inserted. In the case member 100, ink introduction sections 102 are defined on both of the outsides of the accommodation section 101 in the Y direction. The case member 100 is provided with an introduction port 104 for communicating with the ink introduction section 102 and supplying the ink to each ink introduction section 102.

The manifold 130 is configured by the first manifold section 17 and the second manifold section 18 by providing the filter member 40 on the communication plate 15. The manifold 130 is continuously provided in the X direction, and the supply communication passages 19 that communicate each of the pressure chambers 12 and the manifold 130 are disposed side by side in the X direction.

The filter member 40 is provided between the communication plate 15 and the case member 100, and they are adhered with an adhesive. In this way, the communication plate 15, the filter member 40, and the case member 100 are laminated in this order from the Z2 direction to the Z1 direction with an adhesive, so that the manifold 130 and the ink introduction section 102 communicate with each other through the filter hole 50 of the filter member 40.

In the recording head 2 of the present embodiment, ink is supplied to the ink introduction section 102 from the introduction port 104 coupled to an external ink supply unit (not illustrated). Foreign substances are removed from the ink in the ink introduction section 102 by the filter member 40, and the ink is supplied to the manifold 130. Then, after the inside from the manifold 130 to the nozzle 21 is filled with the ink, a voltage is applied to each piezoelectric element 80 corresponding to the pressure chamber 12 according to a recording signal from the drive circuit 121. As a result, the vibration plate 84 bends and deforms together with the piezoelectric element 80, the pressure in each pressure chamber 12 increases, and ink droplets are ejected from each nozzle 21.

Figure 5:
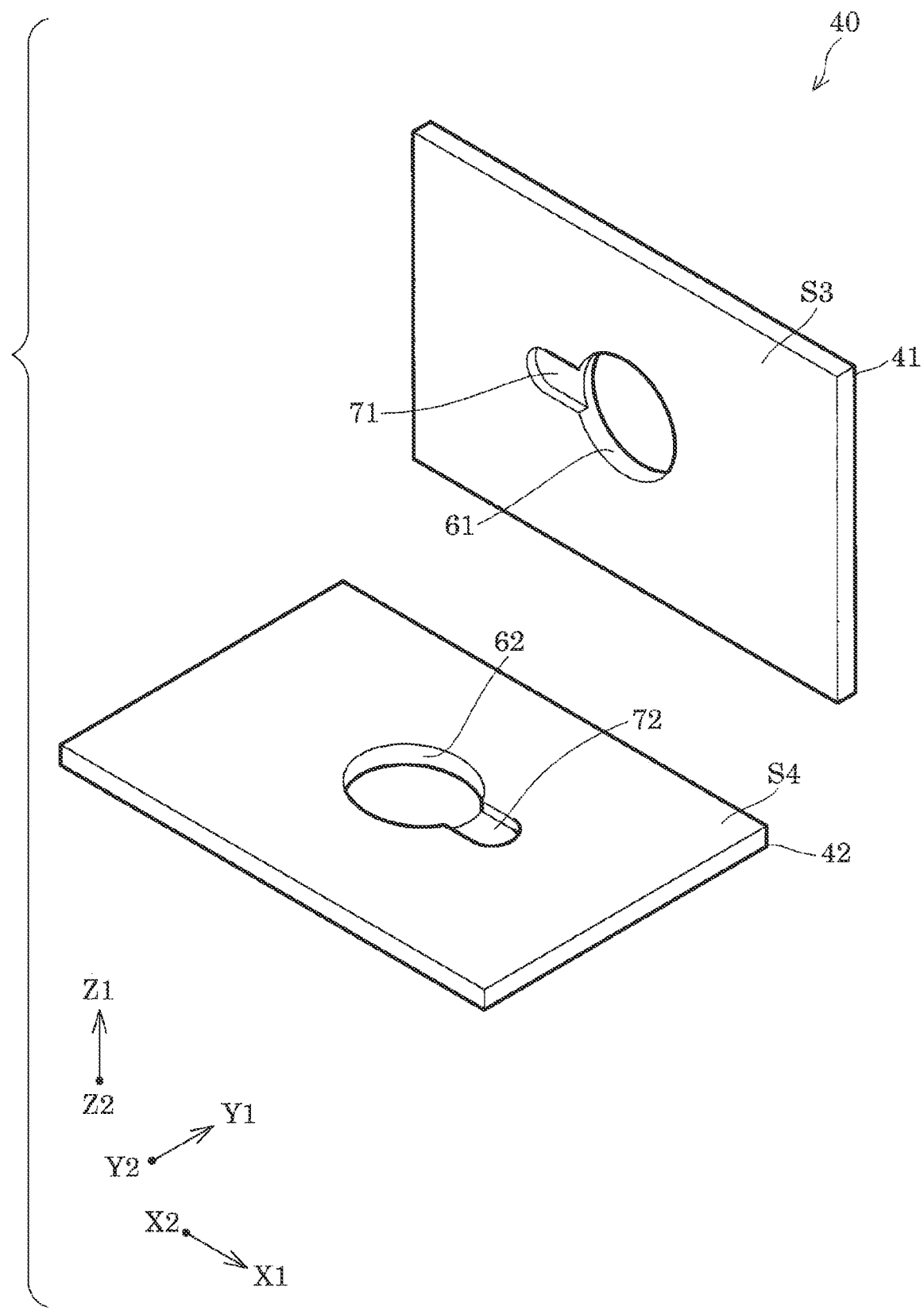
FIG. 5 is a perspective view illustrating a state before bonding a first filter plate and a second filter plate constituting a filter member according to the first embodiment.
Figure 6:
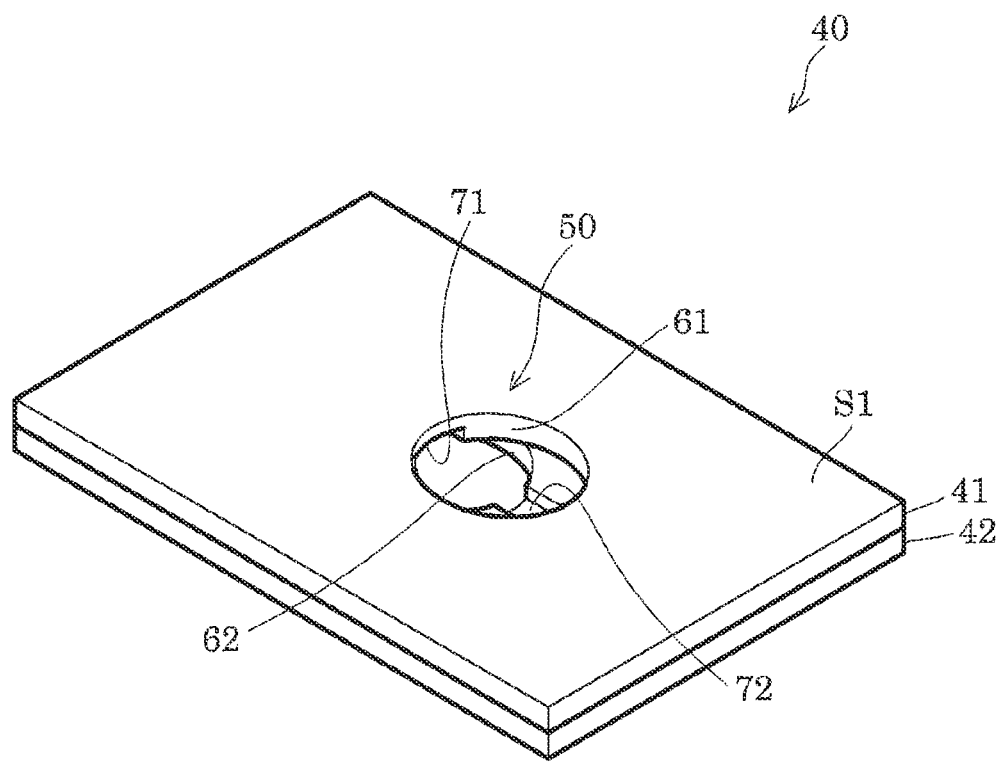
FIG. 6 is a perspective view illustrating a state after bonding the first filter plate and the second filter plate constituting the filter member according to the first embodiment.
Figure 7:
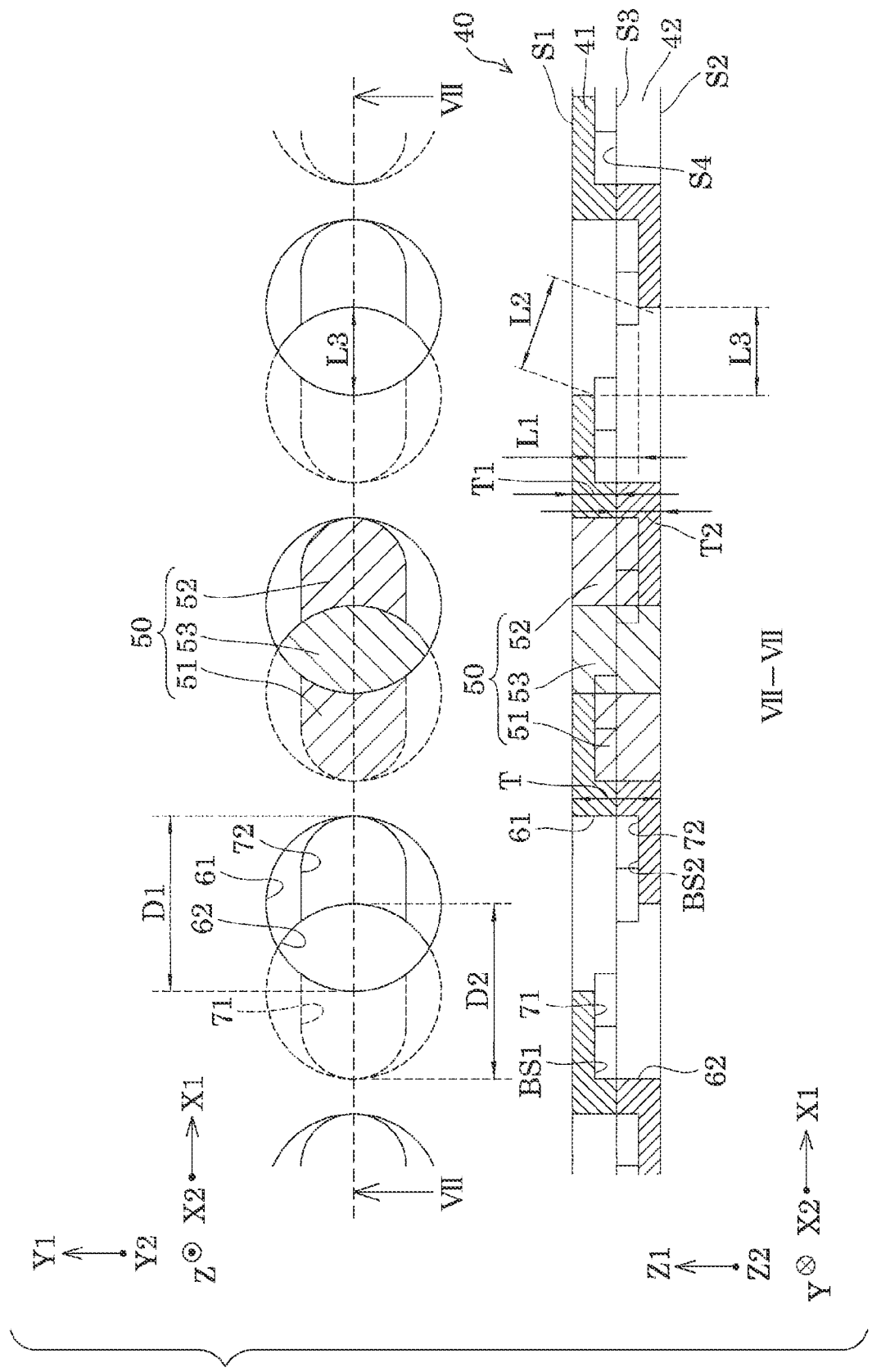
FIG. 7 is a plan view and a cross-sectional view of the filter member according to the first embodiment.

The filter member 40 and the filter hole 50 will be described by using FIGS. 5 to 7. FIG. 5 is a perspective view illustrating a state before bonding a first filter plate 41 and a second filter plate 42 constituting the filter member 40. FIG. 6 is a perspective view illustrating a state after bonding the first filter plate 41 and the second filter plate 42 constituting the filter member 40. FIG. 7 is a plan view and a cross-sectional view of the filter member 40. FIGS. 5 and 6 are enlarged views of one filter hole 50 provided in the filter member 40 and its surroundings.

The filter member 40 is configured by laminating the second filter plate 42 and the first filter plate 41 in a first direction as a plurality of filter plates in this order, and has a plurality of filter holes 50 through which ink passes. In addition, the filter member 40 includes a first surface S1 and a second surface S2 that face opposite directions with respect to the first direction. The first surface S1 and the second surface S2 define an outer surface of the filter member 40.

In the present embodiment, the first direction is the Z1 direction, and an opposite direction with respect to the first direction is the Z2 direction. Therefore, the first surface S1 faces the Z1 direction, and the second surface S2 faces the Z2 direction. The first direction is not limited to the Z1 direction. The first direction can be any direction regardless of the direction in which the ink is ejected. For example, the direction in which the first filter plate 41 and the second filter plate 42 are laminated may be a direction intersecting the ejection direction of the ink, depending on the direction in which the ink flows and the configuration of the recording head 2.

The first filter plate 41 is formed with a first through-hole 61 and defines the first surface S1 of the filter member 40. In addition, a third surface S3 of the first filter plate 41 on the side opposite to the first surface S1 is defined. The second filter plate 42 is formed with a second through-hole 62 and defines the second surface S2 of the filter member 40. In addition, a fourth surface S4 of the second filter plate 42 on the side opposite to the second surface S2 is defined.

As illustrated in FIG. 2, the first filter plate 41 and the second filter plate 42 are formed in a long frame shape in the X direction in which the opening section 45 is provided. For example, by forming a frame-shaped member that is long in the X direction and having the opening section 45 penetrating in the Z direction in SUS, and providing Ni—Pd alloy plating on the surface of the member, the first filter plate 41 and the second filter plate 42 can be formed.

In the first filter plate 41, a plurality of the first through-holes 61 penetrating in the Z direction are formed in the region R (refer to FIG. 3) facing the manifold 130 in plan view when viewed in the Z1 direction. Although the opening shape of the first through-hole 61 is not particularly limited, it is circular in the present embodiment.

In the second filter plate 42, a plurality of the second through-holes 62 penetrating in the Z direction are formed in the region R (refer to FIG. 3) facing the manifold 130 in plan view when viewed in the Z1 direction. Although the opening shape of the second through-hole 62 is not particularly limited, it is circular in the present embodiment. In addition, the second through-hole 62 has the same opening shape as the first through-hole 61 but may have a different opening shape.

In addition, the number and the disposition of the first through-holes 61 formed in the region R of the first filter plate 41 are not particularly limited. In the present embodiment, a predetermined number of the first through-holes 61 are formed at equal intervals along the X direction and the Y direction in the region R of the first filter plate 41. In addition, the number and the disposition of the second through-holes 62 formed in the region R of the second filter plate 42 are not particularly limited. In the present embodiment, a predetermined number of the second through-holes 62 are formed at equal intervals along the X direction and the Y direction in the region R of the second filter plate 42.

The filter hole 50 is a hole provided in the filter member 40 for allowing ink to pass through but for capturing foreign substances. The filter hole 50 includes a first portion 51, a second portion 52, and a penetrating portion 53. In the filter hole 50, the penetrating portion 53 is disposed between the first portion 51 and the second portion 52 with respect to the X1 direction which is the second direction orthogonal to the Z1 direction which is the first direction.

In the present embodiment, the second direction is the X1 direction. Of course, the second direction is not limited to the X1 direction. The second direction may be a direction orthogonal to the first direction, and may be any direction regardless of the X1 direction in which the nozzle 21 of the recording head 2, the pressure chamber 12, and the like are disposed side by side.

The penetrating portion 53 is formed by overlapping parts of the first through-hole 61 and the second through-hole 62, respectively. Specifically, in the filter member 40 in which the first filter plate 41 and the second filter plate 42 are laminated, the first through-hole 61 and the second through-hole 62 do not overlap completely and partially overlap in plan view when viewed in the Z1 direction. In this way, a portion where a part of the first through-hole 61 overlaps with a part of the second through-hole 62 when viewed in the Z1 direction is a penetrating portion 53 that penetrates from the first surface S1 to the second surface S2 of the filter member 40.

The first portion 51 is a portion that is adjacent to the penetrating portion 53 and is recessed by more than half a thickness T of the filter member 40 from the second surface S2 to the first surface S1 when the filter hole 50 is viewed in the Z1 direction. In the present embodiment, when viewed in the Z1 direction, the first portion 51 is a portion adjacent to the penetrating portion 53 on the X2 direction side, and is composed of the first recessed section 71 which will be described later and a portion of the second through-hole 62 other than the penetrating portion 53 and overlapping with the first recessed section 71. The first portion 51 is recessed by the thickness of the first recessed section 71 rather than half the thickness T of the filter member 40. The thickness T of the filter member 40 is equal to a dimension of the filter hole 50 with respect to the Z direction.

In addition, in the present embodiment, a thickness T1 of the first filter plate 41 and a thickness T2 of the second filter plate 42 are equal to each other. Therefore, half the thickness T of the filter member 40 is equal to each of the thickness T1 and the thickness T2. The thickness T1 of the first filter plate 41 and the thickness T2 of the second filter plate 42 may have different thicknesses.

When viewed in the Z1 direction, the second portion 52 is a portion that is adjacent to the penetrating portion 53 and is recessed by more than half the thickness T of the filter member 40 from the first surface S1 to the second surface S2 when the filter hole 50 is viewed in the Z1 direction. In the present embodiment, the second portion 52 is a portion adjacent to the penetrating portion 53 on the X1 direction side, and is composed of the second recessed section 72 which will be described later and a portion of the first through-hole 61 other than the penetrating portion 53 and overlapping with the second recessed section 72. The second portion 52 is recessed by the thickness of the second recessed section 72 rather than half the thickness T of the filter member 40.

The first recessed section 71 is formed in the first filter plate 41. Specifically, on the third surface S3 of the first filter plate 41, the first recessed section 71 that is adjacent to the first through-hole 61 and that overlaps with the second through-hole 62 when viewed in the Z1 direction, which is the first direction, is formed. In the present embodiment, when viewed in the Z1 direction, a width of the first recessed section 71 in the Y direction is formed to be narrower than a width of the first through-hole 61. In addition, when viewed in the Z1 direction, the first recessed section 71 extends from a boundary with the first through-hole 61 in the X2 direction, and an end portion on the X2 direction side is formed in an arc shape to be inscribed in the second through-hole 62.

The second recessed section 72 is formed in the second filter plate 42. Specifically, on the fourth surface S4 of the second filter plate 42, a second recessed section 72 that is adjacent to the second through-hole 62 and overlaps with the first through-hole 61 when viewed in the Z1 direction, which is the first direction, is formed. In the present embodiment, when viewed in the Z1 direction, a width of the second recessed section 72 in the Y direction is formed to be narrower than a width of the second through-hole 62. In addition, when viewed in the Z1 direction, the second recessed section 72 extends from a boundary with the second through-hole 62 in the X1 direction, and an end portion on the X1 direction side is formed in an arc shape to be inscribed in the first through-hole 61. In the present embodiment, the second recessed section 72 has a shape that is a mirror image of the first recessed section 71 in the Y direction in plan view viewed in the Z1 direction, but the shape is not limited to such a shape.

As described above, the entire first recessed section 71 overlaps with the second through-hole 62 when viewed in the Z1 direction. In addition, the entire second recessed section 72 overlaps with the first through-hole 61 when viewed in the Z1 direction. Of course, the first recessed section 71 and the second recessed section 72 are not limited to such a configuration. A part of the first recessed section 71 may not overlap with the second through-hole 62 when viewed in the Z1 direction, and may extend outside the second through-hole 62. Similarly, a part of the second recessed section 72 may not overlap with the first through-hole 61 when viewed in the Z1 direction, and may extend outside the first through-hole 61.

The first through-hole 61 and the first recessed section 71 of the first filter plate 41, which are the elements constituting the filter hole 50 described above, and the second filter plate 42 and the second recessed section 72 may be formed by the electroforming. In addition, it is not limited to the electroforming, and can also be formed by etching a member such as SUS.

The first filter plate 41 and the second filter plate 42 are laminated such that the third surface S3 and the fourth surface S4 are in contact with each other. The first filter plate 41 and the second filter plate 42 are integrated through adhesion with an adhesive or bonding. As a specific bonding method, it is preferable to use diffusion bonding. The diffusion bonding means that the first filter plate 41 and the second filter plate 42 are heated and pressurized without being melted, and the atoms at the bonding interface are diffused and bonded.

By laminating the first filter plate 41 and the second filter plate 42, a part of the first through-hole 61 and a part of the second through-hole 62 overlap with each other to form the penetrating portion 53. In addition, the first portion 51 is formed of the first recessed section 71 and a portion of the second through-hole 62 other than the penetrating portion 53 and overlapping with the first recessed section 71. The second portion 52 is formed of the second recessed section 72 and a portion other than the penetrating portion 53 of the first through-hole 61 and overlapping with the second recessed section 72. The filter hole 50 in which the penetrating portion 53 is disposed is formed between the first recessed section 71 and the second recessed section 72 in the X1 direction which is the second direction.

The filter hole 50 of the present embodiment is defined by one first through-hole 61 and one second through-hole 62 communicating with each other. However, the present disclosure is not limited to the filter hole 50 in which each through-hole is configured on a one-to-one basis as described above.

For example, in the filter hole 50, one first through-hole 61 may communicate with each of the plurality of second through-holes 62, or one second through-hole 62 communicates with each of the plurality of first through-holes 61. As described above, one through-hole may be common to a plurality of other through-holes.

Although the plurality of filter holes 50 are formed in the region R of the filter member 40 facing the manifold 130 and are all illustrated to have the same shape, the individual filter holes 50 may have different shapes.

When viewed in the Z2 direction, a diameter of the maximum inscribed circle inscribed in the first through-hole 61 is defined as D1. Since the first through-hole 61 has a circular shape in the present embodiment, a diameter of the opening of the first through-hole 61 is D1. When viewed in the Z1 direction, a diameter of the maximum inscribed circle inscribed in the second through-hole 62 is defined as D2. Since the second through-hole 62 has a circular shape in the present embodiment, a diameter of the opening of the second through-hole 62 is D2.

In addition, when viewed in the Z1 direction, a diameter of the maximum inscribed circle inscribed in the nozzle 21 is defined as DN. Although the shape of the nozzle 21 when viewed in the Z1 direction is not illustrated, since the nozzle 21 of the present embodiment has a circular shape, a diameter of the opening of the nozzle 21 is DN as illustrated in FIG. 4. As illustrated in FIG. 4, the shape of the nozzle 21 may not be the same with respect to the Z direction, which is the thickness direction of the nozzle plate 20. That is, when viewed in the Z1 direction, the diameter of the maximum inscribed circle inscribed in the nozzle 21 may not be the same with respect to the thickness direction of the nozzle plate 20. Therefore, in such a case, with respect to the thickness direction of the nozzle plate 20, the diameter of the maximum inscribed circle inscribed in the nozzle 21 at the position where the diameter of the maximum inscribed circle inscribed in the nozzle 21 when viewed in the Z1 direction is the smallest is defined as DN.

Although there is no restriction on the magnitude relationship between the diameter D1, the diameter D2, and the diameter DN, it is preferable that both the diameter D1 and the diameter D2 are smaller than the diameter DN. By making the diameter D1 and the diameter D2 smaller than the diameter DN of the nozzle 21 in this way, smaller foreign substances in the ink can be captured and the number of filter holes 50 per unit area can be increased. Therefore, it is possible to reduce the pressure loss of the ink passing through the filter member 40. Of course, the diameter D1 or/and the diameter D2 may be larger than the diameter DN of the nozzle 21.

The shortest distance between a bottom surface BS1 of the first recessed section 71 and a bottom surface BS2 of the second recessed section 72 is defined as L2. The shortest distance L2 means the shortest distance between the bottom surface BS1 of the first recessed section 71 and the bottom surface BS2 of the second recessed section 72 in the cross section where the filter member 40 is cut along the Z1 direction and the X2 direction at a position where a width of the penetrating portion 53 with respect to the X1 direction is maximum.

In the present embodiment, the first through-hole 61 and the second through-hole 62 have circular shapes, and overlap with each other shifted in the X direction to form the penetrating portion 53. Therefore, the position where the width of the penetrating portion 53 with respect to the X1 direction is maximum is a center position of the penetrating portion 53 in the Y direction in plan view viewed in the Z2 direction. A cross section cut along the Z1 direction and the X1 direction at the center position is a cross section taken along line VII-VII in FIG. 7. In such a cross section, a length joining the closest points of the bottom surface BS1 of the first recessed section 71 and the bottom surface BS2 of the second recessed section 72 is the shortest distance L2.

The shortest distance L2 is smaller than the diameter D1. By making the shortest distance L2 smaller than the diameter D1 in this way, it is possible to capture foreign substances in the ink smaller than the diameter D1 but larger than the shortest distance L2 by the filter hole 50. In addition, the shortest distance L2 is smaller than the diameter D2.

By making the shortest distance L2 smaller than the diameter D2 in this way, it is possible to capture foreign substances in the ink smaller than the diameter D2 but larger than the shortest distance L2 by the filter hole 50.

As illustrated in the cross-sectional view taken along line VII-VII in FIG. 7, a distance between the bottom surface BS1 of the first recessed section 71 and the bottom surface BS2 of the second recessed section 72 with respect to the Z1 direction is defined as L1. In the present embodiment, when the bottom surface BS1 of the first recessed section 71 and the bottom surface BS2 of the second recessed section 72 are not flat, the maximum distance between the bottom surface BS1 of the first recessed section 71 and the bottom surface BS2 of the second recessed section 72 with respect to the Z1 direction is defined as L1. In addition, the maximum width of the penetrating portion 53 with respect to the X1 direction is defined as L3.

The distance L1 is smaller than the distance L3. By making the distance L1 smaller than the distance L3 in this way, it is possible to facilitate capturing the foreign substance that is about to flow into the penetrating portion 53 from the second portion 52.

As described above, the recording head 2 according to the present embodiment includes the nozzle 21 that ejects ink, and the filter member 40 including the plurality of filter plates laminated in the Z1 direction and having the plurality of filter holes 50 through which ink supplied to the nozzle 21 passes, in which the filter member 40 includes the first surface S1 and the second surface S2 facing the Z1 direction and the Z2 direction which are opposite directions with respect to the Z direction, the plurality of filter plates include the first filter plate 41 at which the first through-hole 61 is formed and defining the first surface S1, and the second filter plate 42 at which the second through-hole 62 is formed and defining the second surface S2, and the filter hole 50 includes the penetrating portion 53 that is a portion where a part of the first through-hole 61 overlaps with a part of the second through-hole 62 when viewed in the Z1 direction, and that penetrates from the first surface S1 to the second surface S2, and the first portion 51 adjacent to the penetrating portion 53 and recessed by more than half the thickness T of the filter member 40 from the second surface S2 to the first surface S1 when viewed in the Z1 direction.

With such a configuration, the filter hole 50 can be made smaller by partially overlapping the first through-hole 61 and the second through-hole 62. That is, when viewed in the Z1 direction, the penetrating portion 53 of the filter hole 50 is smaller than the opening area of the first through-hole 61 and smaller than the opening area of the second through-hole 62. As described above, the actual size of the mesh of the filter hole 50 is defined by the penetrating portion 53 which is smaller than the first through-hole 61 and the second through-hole 62. Therefore, as compared with a case where the filter hole 50 is configured only by the first through-hole 61 or the second through-hole 62, it is possible to capture the smaller foreign substance or an elongated long foreign substance.

Furthermore, the filter hole 50 includes the first portion 51. With such a configuration, since the cross-sectional area with respect to the flow of the ink flowing through the filter hole 50 is expanded by the first portion 51, it is possible to suppress an increase in the flow path resistance of the filter hole 50.

As described above, in the recording head 2 of the present embodiment, the foreign substance in the ink can be reliably captured by making the size of the actual mesh of the filter hole 50 finer by partially overlapping the first through-hole 61 and the second through-hole 62, and the increase in the flow path resistance of the filter hole 50 can be suppressed and the pressure loss of the ink can be suppressed by providing the first portion 51 in the filter hole 50.

The filter hole 50 includes the second portion 52 that is adjacent to the penetrating portion 53 and is recessed by more than half the thickness T of the filter member 40 from the first surface S1 to the second surface S2 when viewed in the Z1 direction, and the penetrating portion 53 is disposed between the first portion 51 and the second portion 52 with respect to the X1 direction orthogonal to the Z1 direction. With such a configuration, the flow of ink from the first portion 51 to the second portion 52 or from the second portion 52 to the first portion 51 occurs, so that the pressure loss can be suppressed more remarkably.

The first filter plate 41 defines the third surface S3 on the side opposite to the first surface S1, and the second filter plate 42 defines the fourth surface S4 on the side opposite to the second surface S2. The first filter plate 41 and the second filter plate 42 are laminated such that the third surface S3 and the fourth surface S4 are in contact with each other, and the first recessed section 71 that is adjacent to the first through-hole 61 and overlaps with the second through-hole 62 is formed at the third surface S3 of the first filter plate 41 when viewed in the Z1 direction.

With such a configuration, it is possible to form the first portion 51 by laminating the second filter plate 42 on the first filter plate 41 having the first recessed section 71. That is, in order to form the first portion 51 in the filter member 40, the first filter plate 41 having the first recessed section 71 and the second filter plate 42 may be provided, and another member to form the first portion 51 is not required. Therefore, the number of components can be reduced. In addition, when assuming that the rigidity of the filter member obtained by laminating three or more filter plates and the rigidity of the filter member 40 of the present embodiment obtained by laminating the first filter plate 41 and the second filter plate 42 are the same, the filter member 40 of the present embodiment can increase the rigidity of each of the first filter plate 41 and the second filter plate 42 as the number of the filter plates is small.

The fourth surface S4 of the second filter plate 42 is formed with a second recessed section 72 that is adjacent to the second through-hole 62 and overlaps with the first through-hole 61 when viewed in the Z1 direction, and the penetrating portion 53 is disposed between the first recessed section 71 and the second recessed section 72 with respect to the X1 direction orthogonal to the Z1 direction.

With such a configuration, the first filter plate 41 having the first recessed section 71 and the second filter plate 42 having the second recessed section 72 are laminated to form the first portion 51 and the second portion 52. That is, in order to form the first portion 51 and the second portion 52 in the filter member 40, the first filter plate 41 having the first recessed section 71 and the second filter plate 42 having the second recessed section 72 may be provided, and another member to form the first portion 51 and the second portion 52 is not required. Therefore, the number of components can be reduced. In addition, when assuming that the rigidity of the filter member obtained by laminating three or more filter plates and the rigidity of the filter member 40 of the present embodiment obtained by laminating the first filter plate 41 and the second filter plate 42 are the same, the filter member 40 of the present embodiment can increase the rigidity of each of the first filter plate 41 and the second filter plate 42 as the number of the filter plates is small.

The entire first recessed section 71 overlaps with the second through-hole 62 when viewed in the Z1 direction, and the entire second recessed section 72 overlaps with the first through-hole 61 when viewed in the Z1 direction.

When the first recessed section 71 does not overlap with the second through-hole 62, that is, when the first recessed section 71 extends outside the second through-hole 62 when viewed in the Z1 direction, a portion of the first recessed section 71 that extends outside the second through-hole 62 becomes a small gap, and it becomes difficult to discharge air bubbles that have entered the gap. The same applies to the second recessed section 72.

However, in the present embodiment, the first recessed section 71 overlaps with the second through-hole 62 and the second recessed section 72 overlaps with the first through-hole 61, so that a small gap is not formed. Therefore, air bubbles are easily discharged from the filter hole 50. In addition, since the first recessed section 71 is smaller than the second through-hole 62 and the second recessed section 72 is smaller than the first through-hole 61 when viewed in the Z1 direction, it also has the effect of making it difficult for air bubbles to stay in the first recessed section 71 and the second recessed section 72.

The diameter D1 of the maximum inscribed circle inscribed in the first through-hole 61 is smaller than the diameter DN of the maximum inscribed circle inscribed in the nozzle 21. With such a configuration, foreign substances that clog the nozzle 21 can be more reliably captured by the filter hole 50. In addition, since the diameter D1 is smaller than the diameter DN, the size of the mesh of the filter hole 50 becomes small, and the number of the filter holes 50 per unit area in the region R of the filter member 40 can be increased, and the pressure loss of the ink can be further reduced.

In addition, the diameter D2 of the maximum inscribed circle inscribed in the second through-hole 62 is smaller than the diameter DN of the maximum inscribed circle inscribed in the nozzle 21. With such a configuration, foreign substances that clog the nozzle 21 can be more reliably captured by the filter hole 50. In addition, since the diameter D2 is smaller than the diameter DN, the size of the mesh of the filter hole 50 becomes small, and the number of the filter holes 50 per unit area in the region R of the filter member 40 can be increased, and the pressure loss of the ink can be further reduced.

The shortest distance L2 between the bottom surface BS1 of the first recessed section 71 and the bottom surface BS2 of the second recessed section 72 in the cross section where the filter member 40 is cut along the Z1 direction and the X2 direction at a position where a width of the penetrating portion 53 with respect to the X1 direction is maximum is smaller than the diameter D1 of the maximum inscribed circle inscribed in the first through-hole 61. With such a configuration, it is possible to capture foreign substances in the ink smaller than the diameter D1 but larger than the shortest distance L2 by the filter hole 50.

The shortest distance L2 between the bottom surface BS1 of the first recessed section 71 and the bottom surface BS2 of the second recessed section 72 in the cross section where the filter member 40 is cut along the Z1 direction and the X2 direction at a position where a width of the penetrating portion 53 with respect to the X1 direction is maximum is smaller than the diameter D2 of the maximum inscribed circle inscribed in the second through-hole 62. With such a configuration, it is possible to capture foreign substances in the ink smaller than the diameter D2 but larger than the shortest distance L2 by the filter hole 50.

The distance L1 between the bottom surface BS1 of the first recessed section 71 and the bottom surface BS2 of the second recessed section 72 with respect to the Z1 direction is smaller than the distance L3 which is the maximum width of the penetrating portion 53 with respect to the X1 direction. With such a configuration, it is possible to facilitate capturing the foreign substance that is about to flow into the penetrating portion 53 from the second portion 52.

In addition, the filter member 40 according to the present embodiment includes the plurality of filter plates laminated in the Z1 direction and having the plurality of filter holes 50 through which ink supplied to the nozzle 21 passes, in which the filter member 40 includes the first surface S1 and the second surface S2 facing the Z1 direction and the Z2 direction which are opposite directions with respect to the Z direction, the plurality of filter plates include the first filter plate 41 at which the first through-hole 61 is formed and defining the first surface S1, and the second filter plate 42 at which the second through-hole 62 is formed and defining the second surface S2, and the filter hole 50 includes the penetrating portion 53 that is a portion where a part of the first through-hole 61 overlaps with a part of the second through-hole 62 when viewed in the Z1 direction, and that penetrates from the first surface S1 to the second surface S2, and the first portion 51 adjacent to the penetrating portion 53 and recessed by more than half the thickness of the filter member 40 from the second surface S2 to the first surface S1 when viewed in the Z1 direction.

With such a configuration, the filter member 40 is provided that the foreign substance in the ink can be reliably captured by making the size of the actual mesh of the filter hole 50 finer by partially overlapping the first through-hole 61 and the second through-hole 62, and the increase in the flow path resistance of the filter hole 50 can be suppressed and the pressure loss of the ink can be suppressed by providing the first portion 51 in the filter hole 50.

In addition, in the present embodiment, the configuration in which the filter member 40 is interposed between the communication plate 15 of the recording head 2 and the case member 100 is exemplified, but the present disclosure is not limited to such a configuration. The filter member 40 can be provided at any position where the ink flows. That is, the filter member 40 may be provided outside the recording head 2, and specifically, may be provided as a part of a filter unit provided between the recording head 2 and the liquid container 3.

In such a case, the recording apparatus 1 includes the recording head 2 including the nozzle 21 that ejects ink, and the filter member 40 including the plurality of filter plates laminated in the Z1 direction and having the plurality of filter holes 50 through which ink supplied to the nozzle 21 passes, in which the filter member 40 includes the first surface S1 and the second surface S2 facing the Z1 direction and the Z2 direction which are opposite directions with respect to the Z direction, the plurality of filter plates include the first filter plate 41 at which the first through-hole 61 is formed and defining the first surface S1, and the second filter plate 42 at which the second through-hole 62 is formed and defining the second surface S2, and the filter hole 50 includes the penetrating portion 53 that is a portion where a part of the first through-hole 61 overlaps with a part of the second through-hole 62 when viewed in the Z1 direction, and that penetrates from the first surface S1 to the second surface S2, and the first portion 51 adjacent to the penetrating portion 53 and recessed by more than half the thickness T of the filter member 40 from the second surface S2 to the first surface S1 when viewed in the Z1 direction.

With such a configuration, the recording apparatus 1 is provided in which the foreign substance in the ink is reliably captured by making the size of the actual mesh of the filter hole 50 finer by partially overlapping the first through-hole 61 and the second through-hole 62, and the increase in the flow path resistance of the filter hole 50 is suppressed and the pressure loss of the ink is suppressed by providing the first portion 51 in the filter hole 50.

Second Embodiment

Figure 8:
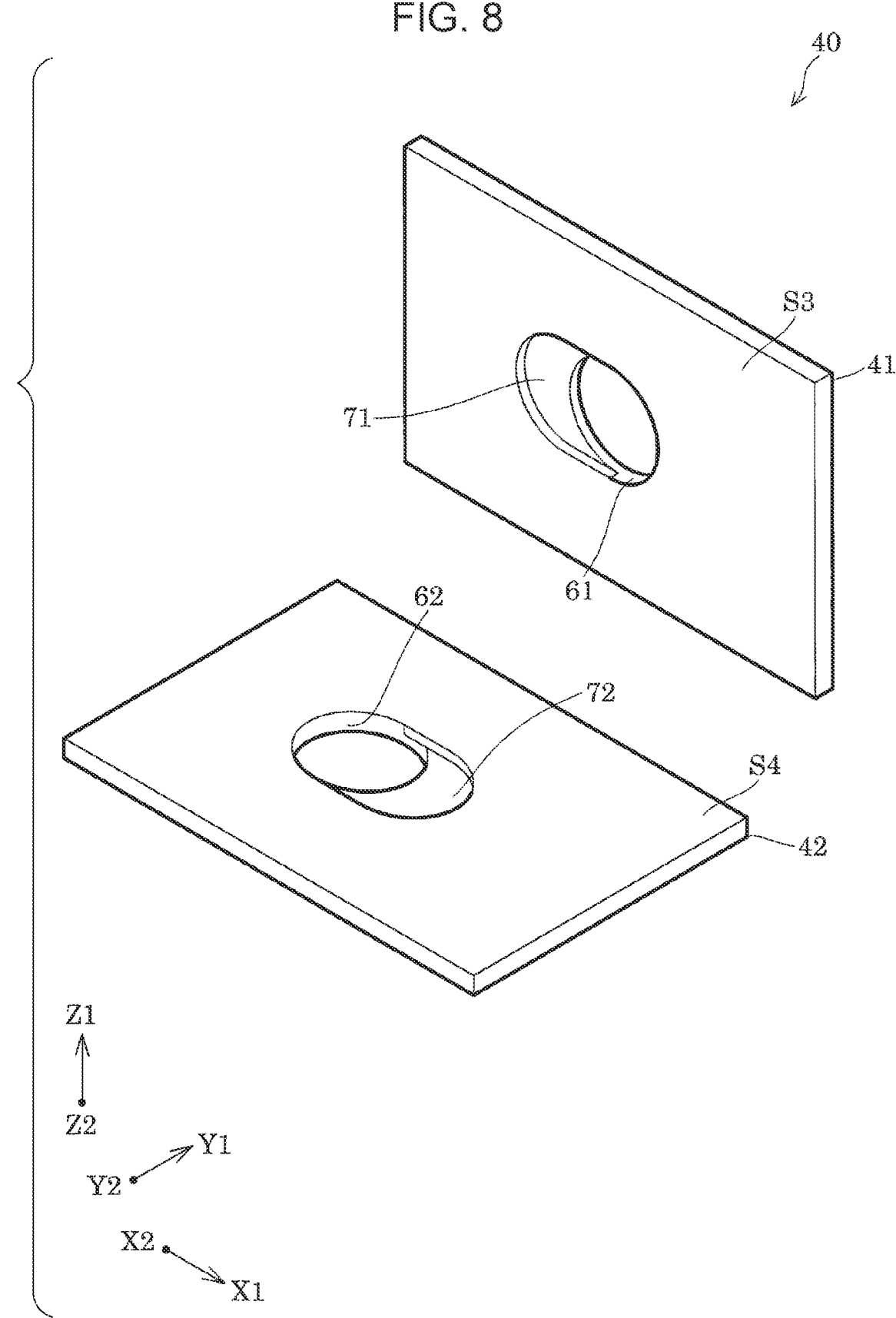
FIG. 8 is a perspective view illustrating a state before bonding a first filter plate and a second filter plate constituting a filter member according to a second embodiment.
Figure 10:
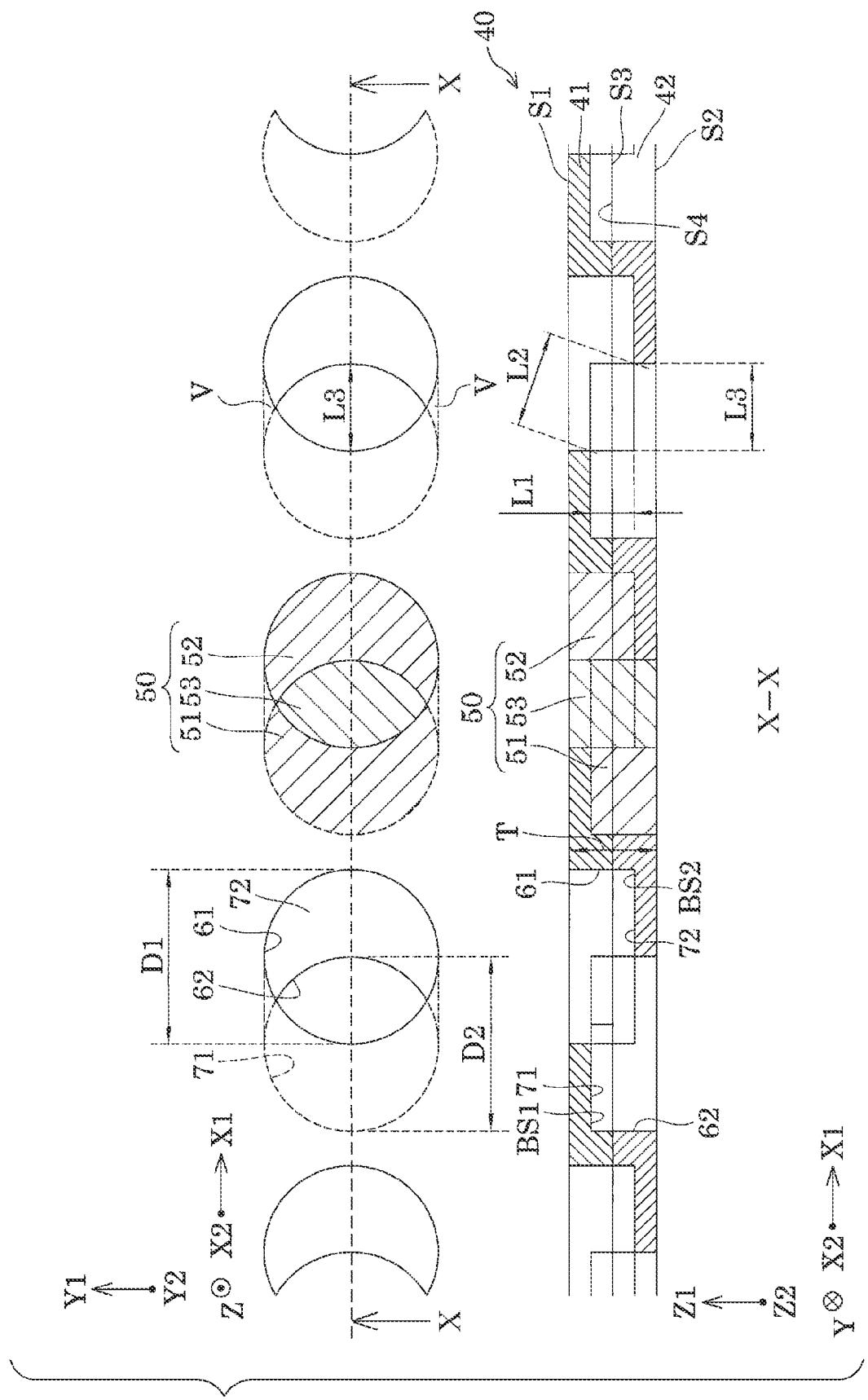
FIG. 10 is a plan view and a cross-sectional view of the filter member according to the second embodiment.

FIG. 8 is a perspective view illustrating a state before bonding a first filter plate 41 and a second filter plate 42 constituting a filter member 40. FIG. 9 is a perspective view illustrating a state after bonding the first filter plate 41 and the second filter plate 42 constituting the filter member 40. FIG. 10 is a plan view and a cross-sectional view of the filter member 40. FIGS. 8 and 9 are enlarged views of one filter hole 50 provided in the filter member 40 and its surroundings. The same members as those in the first embodiment are designated by the same reference numerals, and redundant descriptions will be omitted.

In the filter member 40 of the present embodiment, a first through-hole 61 is formed in the first filter plate 41, and a second through-hole 62 is formed in the second filter plate 42. The first through-hole 61 and the second through-hole 62 have circular shapes as in the first embodiment.

The filter hole 50 includes a first portion 51, a second portion 52, and a penetrating portion 53. In the filter hole 50, the penetrating portion 53 is disposed between the first portion 51 and the second portion 52 with respect to the X1 direction which is the second direction orthogonal to the Z1 direction which is the first direction.

The penetrating portion 53 is formed by overlapping parts of the first through-hole 61 and the second through-hole 62, respectively. Specifically, in the filter member 40 in which the first filter plate 41 and the second filter plate 42 are laminated, the first through-hole 61 and the second through-hole 62 do not overlap completely and partially overlap in plan view when viewed in the Z1 direction. In this way, a portion where a part of the first through-hole 61 overlaps with a part of the second through-hole 62 when viewed in the Z1 direction is a penetrating portion 53 that penetrates from the first surface S1 to the second surface S2 of the filter member 40.

The first portion 51 is a portion that is adjacent to the penetrating portion 53 and is recessed by more than half a thickness T of the filter member 40 from the second surface S2 to the first surface S1 when the filter hole 50 is viewed in the Z1 direction. In the present embodiment, the first portion 51 is a portion adjacent to the penetrating portion 53 on the X2 direction side, and is composed of a portion of the second through-hole 62 other than the penetrating portion 53 and a first recessed section 71 to be described later. The first portion 51 is recessed by the thickness of the first recessed section 71 rather than half the thickness T of the filter member 40.

The second portion 52 is a portion that is adjacent to the penetrating portion 53 and is recessed by more than half a thickness T of the filter member 40 from the first surface S1 to the second surface S2 when the filter hole 50 is viewed in the Z1 direction. In the present embodiment, the second portion 52 is a portion adjacent to the penetrating portion 53 on the X1 direction side, and is composed of a portion of the first through-hole 61 other than the penetrating portion 53 and the second recessed section 72 which will be described later. The second portion 52 is recessed by the thickness of the second recessed section 72 rather than half the thickness T of the filter member 40.

The first recessed section 71 is formed in the first filter plate 41. Specifically, on the third surface S3 of the first filter plate 41, the first recessed section 71 that is adjacent to the first through-hole 61 and that overlaps with the second through-hole 62 when viewed in the Z1 direction, which is the first direction, is formed. In the present embodiment, when viewed in the Z1 direction, a width of the first recessed section 71 in the Y direction is formed to be the same as a width of the first through-hole 61. In addition, when viewed in the Z1 direction, the first recessed section 71 extends from the boundary with the first through-hole 61 in the X2 direction, and an end portion on the X1 direction side is formed in an arc shape to coincide with the arc of the first through-hole 61 and an end portion on the X2 direction side is formed in an arc shape to coincide with the arc of the second through-hole 62.

The second recessed section 72 is formed in the second filter plate 42. Specifically, on the fourth surface S4 of the second filter plate 42, a second recessed section 72 that is adjacent to the second through-hole 62 and overlaps with the first through-hole 61 when viewed in the Z1 direction, which is the first direction, is formed. In the present embodiment, when viewed in the Z1 direction, a width of the second recessed section 72 in the Y direction is formed to be the same as a width of the second through-hole 62. In addition, when viewed in the Z1 direction, the second recessed section 72 extends from the boundary with the second through-hole 62 in the X1 direction, and an end portion on the X2 direction side is formed in an arc shape to coincide with the arc of the second through-hole 62 and an end portion on the X1 direction side is formed in an arc shape to coincide with the arc of the first through-hole 61. In the present embodiment, the second recessed section 72 has a shape that is a mirror image of the first recessed section 71 in the Y direction in plan view viewed in the Z1 direction, but the shape is not limited to such a shape.

The first recessed section 71 of the present embodiment does not entirely overlap with the second through-hole 62 when viewed in the Z1 direction. Specifically, in the first recessed section 71, at the end portions of the boundary portion with the second through-hole 62 in the Y1 direction and the Y2 direction, a gap V that does not overlap with the second through-hole 62 is provided. Similarly, the second recessed section 72 does not entirely overlap with the first through-hole 61 when viewed in the Z1 direction. Specifically, in the second recessed section 72, at the end portions of the boundary portion with the first through-hole 61 in the Y1 direction and the Y2 direction, a gap V that does not overlap with the first through-hole 61 is provided. The gap V is a portion where the first recessed section 71 and the second recessed section 72 overlap with each other when viewed in the Z direction. That is, the gap V is a gap interposed between the bottom surface BS1 of the first recessed section 71 and the bottom surface BS2 of the second recessed section 72.

By laminating the first filter plate 41 and the second filter plate 42, a part of the first through-hole 61 and a part of the second through-hole 62 overlap with each other to form the penetrating portion 53. In addition, the first portion 51 is formed of the first recessed section 71 and a portion of the second through-hole 62 other than the penetrating portion 53.

The second portion 52 is formed of the second recessed section 72 and a portion of the first through-hole 61 other than the penetrating portion 53. The filter hole 50 in which the penetrating portion 53 is disposed is formed between the first recessed section 71 and the second recessed section 72 in the X1 direction which is the second direction.

The filter hole 50 of the present embodiment is defined by one first through-hole 61 and one second through-hole 62 communicating with each other. However, the present disclosure is not limited to the filter hole 50 in which each through-hole is configured on a one-to-one basis as described above.

For example, in the filter hole 50, one first through-hole 61 may communicate with each of the plurality of second through-holes 62, or one second through-hole 62 communicates with each of the plurality of first through-holes 61. As described above, one through-hole may be common to a plurality of other through-holes.

In addition, although the plurality of filter holes 50 are formed in the region R of the filter member 40 facing the manifold 130, the individual filter holes 50 may have different shapes.

Although the plurality of filter holes 50 formed in the region R are all illustrated to have the same shape, the present disclosure is not limited thereto, and the plurality of filter holes 50 may have different shapes.

When viewed in the Z2 direction, a diameter of the maximum inscribed circle inscribed in the first through-hole 61 is defined as D1. Since the first through-hole 61 has a circular shape in the present embodiment, a diameter of the opening of the first through-hole 61 is D1. When viewed in the Z1 direction, a diameter of the maximum inscribed circle inscribed in the second through-hole 62 is defined as D2. Since the second through-hole 62 has a circular shape in the present embodiment, a diameter of the opening of the second through-hole 62 is D2. In addition, as in the first embodiment, when viewed in the Z1 direction, a diameter of the maximum inscribed circle inscribed in the nozzle 21 (not illustrated) is defined as DN.

Although there is no restriction on the magnitude relationship between the diameter D1, the diameter D2, and the diameter DN, it is preferable that both the diameter D1 and the diameter D2 are smaller than the diameter DN. By making the diameter D1 and the diameter D2 smaller than the diameter DN of the nozzle 21 in this way, smaller foreign substances in the ink can be captured and the number of filter holes 50 per unit area can be increased. Therefore, it is possible to reduce the pressure loss of the ink passing through the filter member 40. Of course, the diameter D1 or/and the diameter D2 may be larger than the diameter DN of the nozzle 21.

The shortest distance between a bottom surface BS1 of the first recessed section 71 and a bottom surface BS2 of the second recessed section 72 is defined as L2. The shortest distance L2 means the shortest distance between the bottom surface BS1 of the first recessed section 71 and the bottom surface BS2 of the second recessed section 72 in the cross section where the filter member 40 is cut along the Z1 direction and the X2 direction at a position where a width of the penetrating portion 53 with respect to the X1 direction is maximum.

In the present embodiment, the first through-hole 61 and the second through-hole 62 have circular shapes, and overlap with each other shifted in the X direction to form the penetrating portion 53. Therefore, the position where the width of the penetrating portion 53 with respect to the X1 direction is maximum is a center position of the penetrating portion 53 in the Y direction in plan view viewed in the Z2 direction. A cross section cut along the Z1 direction and the X1 direction at the center position is a cross section taken along line X-X in FIG. 10. In such a cross section, a length joining the closest points of the bottom surface BS1 of the first recessed section 71 and the bottom surface BS2 of the second recessed section 72 is the shortest distance L2.

The shortest distance L2 is smaller than the diameter D1. By making the shortest distance L2 smaller than the diameter D1 in this way, it is possible to capture foreign substances in the ink smaller than the diameter D1 but larger than the shortest distance L2 by the filter hole 50. In addition, the shortest distance L2 is smaller than the diameter D2.

By making the shortest distance L2 smaller than the diameter D2 in this way, it is possible to capture foreign substances in the ink smaller than the diameter D2 but larger than the shortest distance L2 by the filter hole 50.

A distance between the bottom surface BS1 of the first recessed section 71 and the bottom surface BS2 of the second recessed section 72 with respect to the Z1 direction is defined as L1. In the present embodiment, as illustrated in the cross-sectional view taken along line X-X in FIG. 10, the distance L1 is a distance between the bottom surface BS1 of the first recessed section 71 and the bottom surface BS2 of the second recessed section 72 with respect to the Z1 direction. When the bottom surface BS1 of the first recessed section 71 and the bottom surface BS2 of the second recessed section 72 are not flat, the maximum distance between the bottom surface BS1 of the first recessed section 71 and the bottom surface BS2 of the second recessed section 72 with respect to the Z1 direction is defined as L1. In addition, the maximum width of the penetrating portion 53 with respect to the X1 direction is defined as L3.

The distance L1 is smaller than the distance L3. By making the distance L1 smaller than the distance L3 in this way, it is possible to facilitate capturing the foreign substance that is about to flow into the penetrating portion 53 side from the second portion 52 side.

In the recording head 2 according to the first embodiment, the entire first recessed section 71 overlaps with the second through-hole 62 when viewed in the Z1 direction, and the entire second recessed section 72 overlaps with the first through-hole 61 when viewed in the Z1 direction. On the other hand, in the recording head 2 according to the present embodiment, the entire first recessed section 71 does not overlap with the second through-hole 62 when viewed in the Z1 direction, the entire second recessed section 72 does not overlap with the first through-hole 61 when viewed in the Z1 direction, and a part of the first recessed section 71 and a part of the second recessed section 72 form a gap V.

Although the recording head 2 of the present embodiment makes it difficult to discharge air bubbles due to such a small gap V, other actions and effects are the same as those of the recording head 2 of the first embodiment.

Third Embodiment

Figure 11:
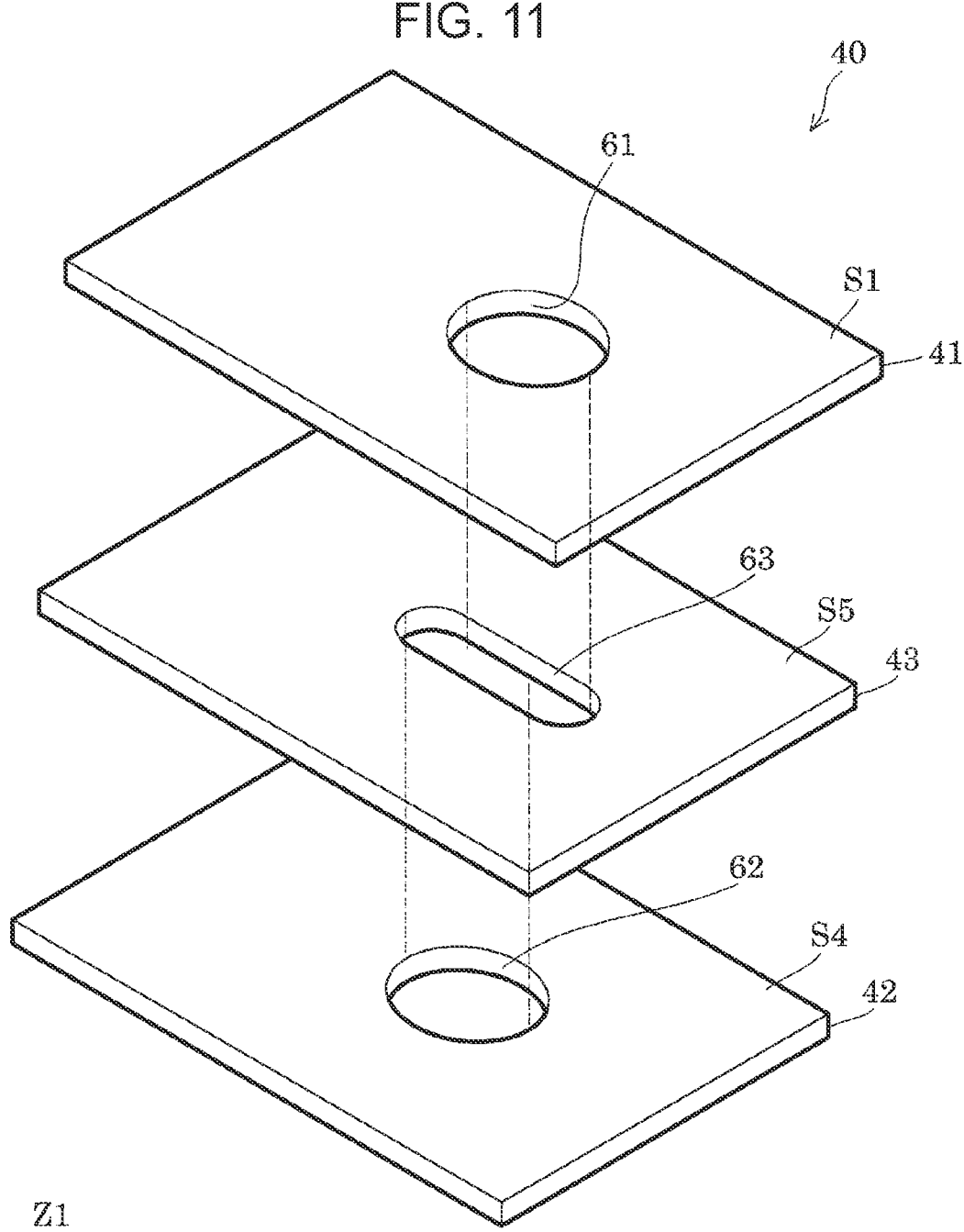
FIG. 11 is a perspective view illustrating a state before bonding a first filter plate, a second filter plate, and a third filter plate constituting a filter member according to a third embodiment.
Figure 12:
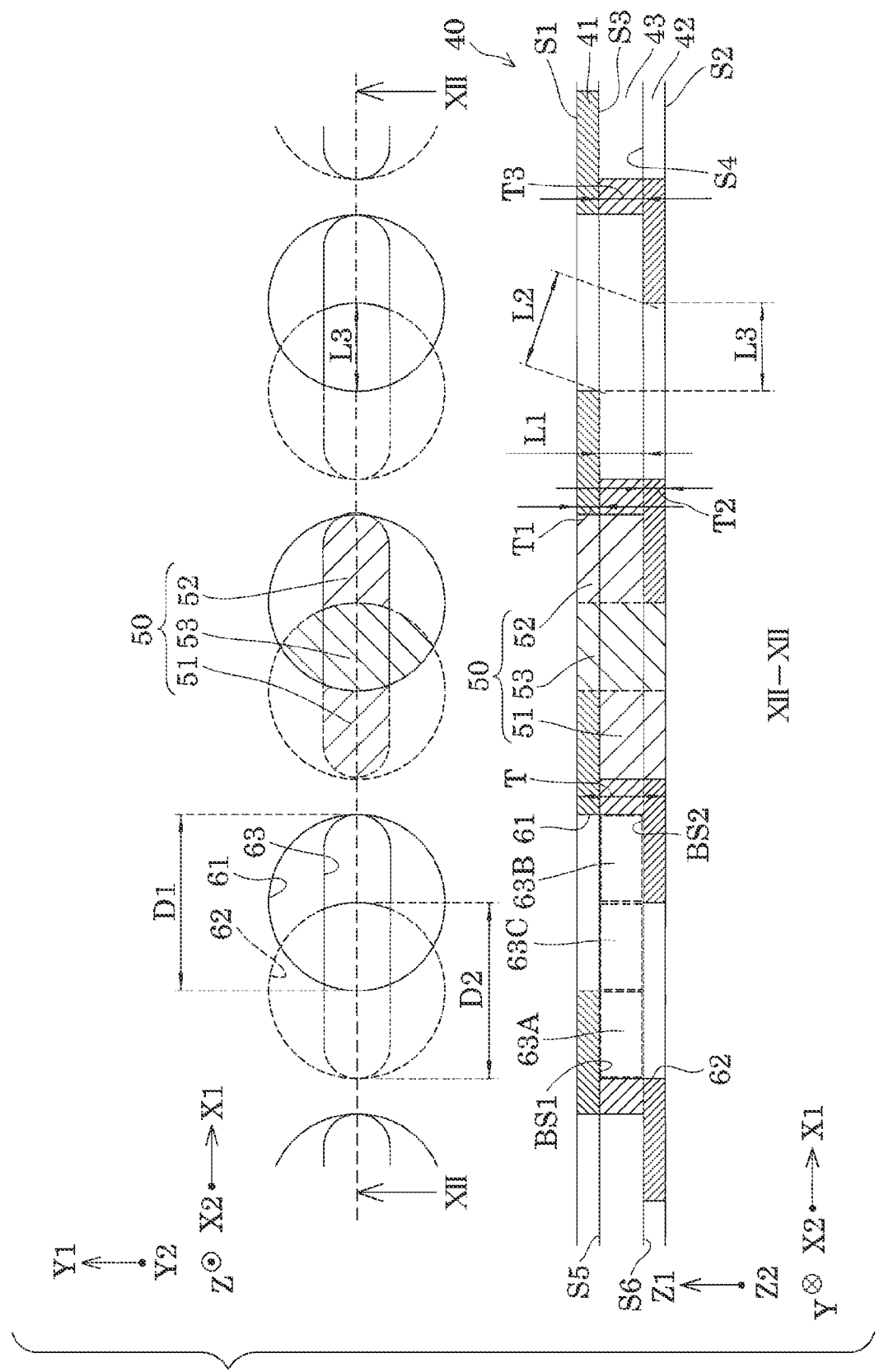
FIG. 12 is a plan view and a cross-sectional view of the filter member according to the third embodiment.

FIG. 11 is a perspective view illustrating a state before bonding a first filter plate 41, a second filter plate 42, and a third filter plate 43 constituting a filter member 40. FIG. 12 is a plan view and a cross-sectional view of the filter member 40. FIG. 11 is an enlarged view of one filter hole 50 provided in the filter member 40 and its surroundings. The same members as those in the first embodiment are designated by the same reference numerals, and redundant descriptions will be omitted.

The filter member 40 is configured by laminating the second filter plate 42, the third filter plate 43, and the first filter plate 41 in a first direction as a plurality of filter plates in this order, and has a plurality of filter holes 50 through which ink passes. In addition, the filter member 40 includes a first surface S1 facing the Z1 direction, which is the first direction, and a second surface S2 facing the Z2 direction opposite to the first direction. The first filter plate 41, the second filter plate 42, and the third filter plate 43 are integrated through adhesion with an adhesive or bonding. In the present embodiment, they are integrated by bonding.

The third filter plate 43 is a member at which the third through-hole 63 is formed and is sandwiched between the first filter plate 41 and the second filter plate 42. In addition, the third filter plate 43 has a fifth surface S5 bonded to the third surface S3 of the first filter plate 41 and a sixth surface S6 bonded to the fourth surface S4 of the second filter plate 42.

As illustrated in FIG. 2, as in the first filter plate 41 and the second filter plate 42, the third filter plate 43 is formed in a long frame shape in the X direction in which the opening section 45 is provided. For example, by forming a frame-shaped member that is long in the X direction and having the opening section 45 penetrating in the Z direction in SUS, and providing Ni—Pd alloy plating on the surface of the member, the third filter plate 43 can be formed.

In the filter member 40 of the present embodiment, a plurality of first through-holes 61 are formed in the first filter plate 41, and a plurality of second through-holes 62 are formed in the second filter plate 42. The first through-hole 61 and the second through-hole 62 have circular shapes as in the first embodiment.

The third filter plate 43 has a plurality of third through-holes 63 penetrating in the Z direction. When viewed in the Z1 direction, the third through-hole 63 has a third penetrating section 63C that is a portion that overlaps with the first through-hole 61 and the second through-hole 62, a first penetrating section 63A that is a portion that overlaps with the second through-hole 62 but does not overlap with the first through-hole, and a second penetrating section 63B that is a portion that overlaps with the first through-hole 61 but does not overlap with the second through-hole 62. The first penetrating section 63A is a part of the first portion 51, the second penetrating section 63B is a part of the second portion 52, and the third penetrating section 63C is a part of the penetrating portion 53. Although the shape of the third through-hole 63 when viewed in the Z1 direction is not particularly limited, it is basically rectangular and has a rounded rectangle in which both end portions in the X direction, which is the longitudinal direction, are semicircular in the present embodiment.

The first penetrating section 63A corresponds to a portion of the third through-hole 63 on the X2 direction side, which is one side of the second direction with respect to the penetrating portion 53. The second penetrating section 63B corresponds to a portion of the third through-hole 63 on the X1 direction side, which is the other side of the second direction with respect to the penetrating portion 53.

In addition, the entire first penetrating section 63A overlaps with the second through-hole 62 when viewed in the Z1 direction. The entire second penetrating section 63B overlaps with the first through-hole 61 when viewed in the Z1 direction. Of course, the entire first penetrating section 63A may not overlap with the second through-hole 62 when viewed in the Z1 direction, and may extend outward from the second through-hole 62. Similarly, the entire second penetrating section 63B may not overlap with the first through-hole 61 when viewed in the Z1 direction, and may extend outward from the first through-hole 61.

The filter hole 50 includes a first portion 51, a second portion 52, and a penetrating portion 53. In the filter hole 50, the penetrating portion 53 is disposed between the first portion 51 and the second portion 52 with respect to the X1 direction which is the second direction orthogonal to the Z1 direction which is the first direction.

The penetrating portion 53 is formed by overlapping a part of each of the first through-hole 61 and the second through-hole 62 with the third penetrating section 63C. Specifically, in the filter member 40 in which the first filter plate 41, the second filter plate 42, the third filter plate 43 are laminated, the first through-hole 61 and the second through-hole 62 do not overlap completely and partially overlap in plan view when viewed in the Z1 direction. Furthermore, the third penetrating section 63C of the third through-hole 63 of the third filter plate 43 overlaps with a part where the first through-hole 61 overlaps with the second through-hole 62 to form the penetrating portion 53. In this way, a portion where a part of the first through-hole 61, a part of the second through-hole 62, and the third penetrating section 63C overlap with each other when viewed in the Z1 direction is a penetrating portion 53 that penetrates from the first surface S1 to the second surface S2 of the filter member 40.

The first portion 51 is a portion that is adjacent to the penetrating portion 53 and is recessed by more than half a thickness T of the filter member 40 from the second surface S2 to the first surface S1 when the filter hole 50 is viewed in the Z1 direction. In the present embodiment, when viewed in the Z1 direction, the first portion 51 is a portion adjacent to the penetrating portion 53 on the X2 direction side, and is composed of the first penetrating section 63A of the third through-hole 63 on the X2 direction side from the third penetrating section 63C, and a portion of the second through-hole 62 other than the penetrating portion 53 and overlapping with the first penetrating section 63A. The first portion 51 is recessed by more than half the thickness T of the filter member 40.

The second portion 52 is a portion that is adjacent to the penetrating portion 53 and is recessed by more than half a thickness T of the filter member 40 from the first surface S1 to the second surface S2 when the filter hole 50 is viewed in the Z1 direction. In the present embodiment, when viewed in the Z1 direction, the second portion 52 is a portion adjacent to the penetrating portion 53 on the X1 direction side, and is composed of the second penetrating section 63B of the third through-hole 63 on the X1 direction side from the third penetrating section 63C, and a portion of the first through-hole 61 other than the penetrating portion 53 and overlapping with the second penetrating section 63B. The second portion 52 is recessed by more than half the thickness T of the filter member 40.

By laminating the first filter plate 41, the second filter plate 42, and the third filter plate 43, a part of the first through-hole 61, a part of the second through-hole 62, and the third penetrating section 63C overlap with each other to form the penetrating portion 53. In addition, the first portion 51 is formed of the first penetrating section 63A and the portion of the second through-hole 62 other than the penetrating portion 53 and overlapping with the first penetrating section 63A. The second portion 52 is formed of the second penetrating section 63B and a portion of the first through-hole 61 other than the penetrating portion 53 and overlapping with the second penetrating section 63B. The filter hole 50 in which the penetrating portion 53 is disposed is formed between the first portion 51 and the second portion 52 in the X1 direction which is the second direction.

One filter hole 50 of the present embodiment is defined by one first through-hole 61, one second through-hole 62, and one third through-hole 63 communicating with each other. However, the present disclosure is not limited to the filter hole 50 in which each through-hole is configured on a one-to-one-to-one basis as described above.

For example, in the filter hole 50, one third through-hole 63 may communicate with each of the plurality of first through-holes 61, or one third through-hole 63 communicates with each of the plurality of second through-holes 62. In addition, one first through-hole 61 may communicate with the plurality of third through-holes 63, or one second through-hole 62 may communicate with the plurality of third through-holes 63. As described above, one through-hole may be common to a plurality of other through-holes.

In addition, although the plurality of filter holes 50 are formed in the region R of the filter member 40 facing the manifold 130 and are all illustrated to have the same shape, the individual filter holes 50 may have different shapes.

When viewed in the Z2 direction, a diameter of the maximum inscribed circle inscribed in the first through-hole 61 is defined as D1. Since the first through-hole 61 has a circular shape in the present embodiment, a diameter of the opening of the first through-hole 61 is D1. When viewed in the Z1 direction, a diameter of the maximum inscribed circle inscribed in the second through-hole 62 is defined as D2. Since the second through-hole 62 has a circular shape in the present embodiment, a diameter of the opening of the second through-hole 62 is D2. In addition, when viewed in the Z1 direction, a diameter of the maximum inscribed circle inscribed in the nozzle 21 (not illustrated) is defined as DN.

Although there is no restriction on the magnitude relationship between the diameter D1, the diameter D2, and the diameter DN, it is preferable that both the diameter D1 and the diameter D2 are smaller than the diameter DN. By making the diameter D1 and the diameter D2 smaller than the diameter DN of the nozzle 21 in this way, smaller foreign substances in the ink can be captured and the number of filter holes 50 per unit area can be increased. Therefore, it is possible to reduce the pressure loss of the ink passing through the filter member 40. Of course, the diameter D1 or/and the diameter D2 may be larger than the diameter DN of the nozzle 21.

The shortest distance between a bottom surface BS1 of the first portion 51 and a bottom surface BS2 of the second portion 52 is defined as L2. The shortest distance L2 means the shortest distance between the bottom surface BS1 of the first portion 51 and the bottom surface BS2 of the second portion 52 in the cross section where the filter member 40 is cut along the Z1 direction and the X2 direction at a position where a width of the penetrating portion 53 with respect to the X1 direction is maximum. The bottom surface BS1 of the first portion 51 corresponds to a portion that defines the first portion 51 in the third surface S3 of the first filter plate 41. Similarly, the bottom surface BS2 of the second portion 52 corresponds to a portion that defines the second portion 52 in the fourth surface S4 of the second filter plate 42.

In the present embodiment, the first through-hole 61 and the second through-hole 62 have circular shapes, and the penetrating portion 53 is formed with a portion where the first through-hole 61 and the second through-hole 62 overlap with each other while being displaced in the X direction. Therefore, the position where the width of the penetrating portion 53 with respect to the X1 direction is maximum is a center position of the penetrating portion 53 in the Y direction in plan view viewed in the Z2 direction. A cross section cut along the Z1 direction and the X1 direction at the center position is a cross section taken along line XII-XII in FIG. 12. In such a cross section, a length joining the closest points of the bottom surface BS1 of the first portion 51 and the bottom surface BS2 of the second portion 52 is the shortest distance L2.

The shortest distance L2 is smaller than the diameter D1. By making the shortest distance L2 smaller than the diameter D1 in this way, it is possible to capture foreign substances in the ink smaller than the diameter D1 but larger than the shortest distance L2 by the filter hole 50. In addition, the shortest distance L2 is smaller than the diameter D2.

By making the shortest distance L2 smaller than the diameter D2 in this way, it is possible to capture foreign substances in the ink smaller than the diameter D2 but larger than the shortest distance L2 by the filter hole 50.

A dimension of the third through-hole 63 with respect to the Z1 direction is referred to as a distance L1. In other words, the distance L1 is a thickness T3 of the third filter plate 43 with respect to the Z1 direction. The distance L1 is smaller than the distance L3, which is the maximum width of the penetrating portion 53 with respect to the X1 direction. By making the distance L1 smaller than the distance L3 in this way, it is possible to facilitate capturing the foreign substance that is about to flow into the penetrating portion 53 from the second portion 52.

As described above, the recording head 2 according to the present embodiment includes the nozzle 21 that ejects ink, and the filter member 40 including the plurality of filter plates laminated in the Z1 direction and having the plurality of filter holes 50 through which ink supplied to the nozzle 21 passes, in which the filter member 40 includes the first surface S1 and the second surface S2 facing the Z1 direction and the Z2 direction which are opposite directions with respect to the Z direction, the plurality of filter plates include the first filter plate 41 at which the first through-hole 61 is formed and defining the first surface S1, and the second filter plate 42 at which the second through-hole 62 is formed and defining the second surface S2, and the filter hole 50 includes the penetrating portion 53 that is a portion where a part of the first through-hole 61 overlaps with a part of the second through-hole 62 when viewed in the Z1 direction, and that penetrates from the first surface S1 to the second surface S2, and the first portion 51 adjacent to the penetrating portion 53 and recessed by more than half the thickness T of the filter member 40 from the second surface S2 to the first surface S1 when viewed in the Z1 direction.

With such a configuration, the same effects as those of the recording head 2 of the first embodiment can be obtained.

Furthermore, the filter member 40 further includes the third filter plate 43 at which the third through-hole 63 is formed and sandwiched between the first filter plate 41 and the second filter plate 42. When viewed in the Z1 direction, the third through-hole 63 has a third penetrating section 63C that is a portion that overlaps with the first through-hole 61 and the second through-hole 62, a first penetrating section 63A that is a portion that overlaps with the second through-hole 62 but does not overlap with the first through-hole 61, and a second penetrating section 63B that is a portion that overlaps with the first through-hole 61 but does not overlap with the second through-hole 62.

With such a configuration, the same effects as those of the recording head 2 of the first embodiment can be obtained.

Furthermore, the filter member 40 is configured by laminating three of the first filter plate 41, the second filter plate 42, and the third filter plate 43, each of which has only through-holes formed therein. Therefore, since it is sufficient to form only through-holes in each of the filter plates, there is an effect that the filter plates can be easily manufactured.

A thickness of the third filter plate 43 is thicker than the thickness of the first filter plate 41 and the thickness of the second filter plate 42. With such a configuration, it is possible to increase the rigidity of the third filter plate 43. In particular, in order to reduce the pressure loss of the ink passing through the filter hole 50, when the third through-hole 63 is larger than each of the first through-hole 61 and the second through-hole 62 when viewed in the Z1 direction, the rigidity of the third filter plate 43 tends to decrease in comparison with the first filter plate 41 and the second filter plate 42, but by making the thickness T3 of the third filter plate 43 thicker than the thickness T1 of the first filter plate 41 and the thickness T2 of the second filter plate 42, the decrease in the rigidity of the third filter plate 43 can be suppressed. When each of the first through-hole 61 and the second through-hole 62 is larger than the third through-hole 63 when viewed in the Z1 direction as in the present embodiment, the thickness T1 of the first filter plate 41 and the thickness T2 of the second filter plate 42 may be thicker than the thickness T3 of the third filter plate 43 in order to improve the rigidity of the first filter plate 41 and the second filter plate 42. However, even in this case, in order to reduce the pressure loss of the ink passing through the filter hole 50, in other words, in order to increase the distance L1, the thickness T3 of the third filter plate 43 may be thicker than the thickness T1 of the first filter plate 41 and the thickness T2 of the second filter plate 42.

One filter hole 50 is defined by one first through-hole 61, one second through-hole 62, and one third through-hole 63 communicating with each other. With such a configuration, since a partition wall is provided between the filter holes 50, for example, the rigidity can be improved in comparison with a configuration in which the third through-hole 63 is common to the plurality of first through-holes 61 and the plurality of second through-holes 62.

The entire first penetrating section 63A, which is a portion of the third through-hole 63 on one side of the X direction with respect to the penetrating portion 53, overlaps with the second through-hole 62 when viewed in the Z1 direction, and the entire second penetrating section 63B, which is a portion of the third through-hole 63 on the other side of the X direction with respect to the penetrating portion 53, overlaps with the first through-hole 61 when viewed in the Z1 direction.

With such a configuration, since the first penetrating section 63A overlaps with the second through-hole 62, and the second penetrating section 63B overlaps with the first through-hole 61, a small gap V as illustrated in FIG. 10 of the second embodiment is not formed, and air bubbles can be easily discharged. In addition, since the first penetrating section 63A is smaller than the second through-hole 62 and the second penetrating section 63B is smaller than the first through-hole 61 when viewed in the Z1 direction, it has the effect of making it difficult for air bubbles to stay in the first penetrating section 63A and the second penetrating section 63B.

The diameter D1 of the maximum inscribed circle inscribed in the first through-hole 61 is smaller than the diameter DN of the maximum inscribed circle inscribed in the nozzle 21. With such a configuration, the same effects as those of the recording head 2 of the first embodiment can be obtained.

In addition, the diameter D2 of the maximum inscribed circle inscribed in the second through-hole 62 is smaller than the diameter DN of the maximum inscribed circle inscribed in the nozzle 21. With such a configuration, the same effects as those of the recording head 2 of the first embodiment can be obtained.

The shortest distance L2 between the bottom surface BS1 of the first portion 51 and the bottom surface BS2 of the second portion 52 in the cross section where the filter member 40 is cut along the Z1 direction and the X2 direction at a position where a width of the penetrating portion 53 with respect to the X1 direction is maximum is smaller than the diameter D1 of the maximum inscribed circle inscribed in the first through-hole 61. With such a configuration, it is possible to capture foreign substances in the ink smaller than the diameter D1 but larger than the shortest distance L2 by the filter hole 50.

The shortest distance L2 between the bottom surface BS1 of the first portion 51 and the bottom surface BS2 of the second portion 52 in the cross section where the filter member 40 is cut along the Z1 direction and the X2 direction at a position where a width of the penetrating portion 53 with respect to the X1 direction is maximum is smaller than the diameter D2 of the maximum inscribed circle inscribed in the second through-hole 62. With such a configuration, it is possible to capture foreign substances in the ink smaller than the diameter D2 but larger than the shortest distance L2 by the filter hole 50.

The distance L1, which is a dimension of the third through-hole 63 with respect to the Z1 direction is smaller than the distance L3 which is the maximum width of the penetrating portion 53 with respect to the X1 direction. With such a configuration, it is possible to facilitate capturing the foreign substance that is about to flow into the penetrating portion 53 from the second portion 52.

Fourth Embodiment

Figure 13:
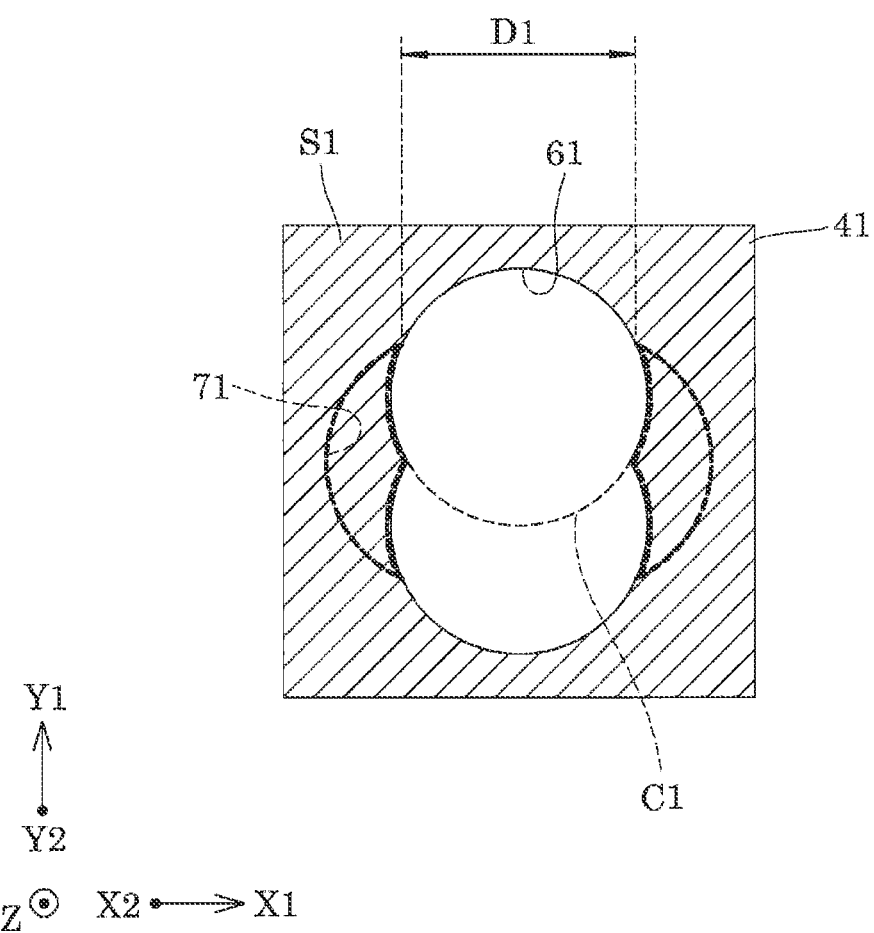
FIG. 13 is a plan view of a first filter plate constituting a filter member according to a fourth embodiment.
Figure 14:
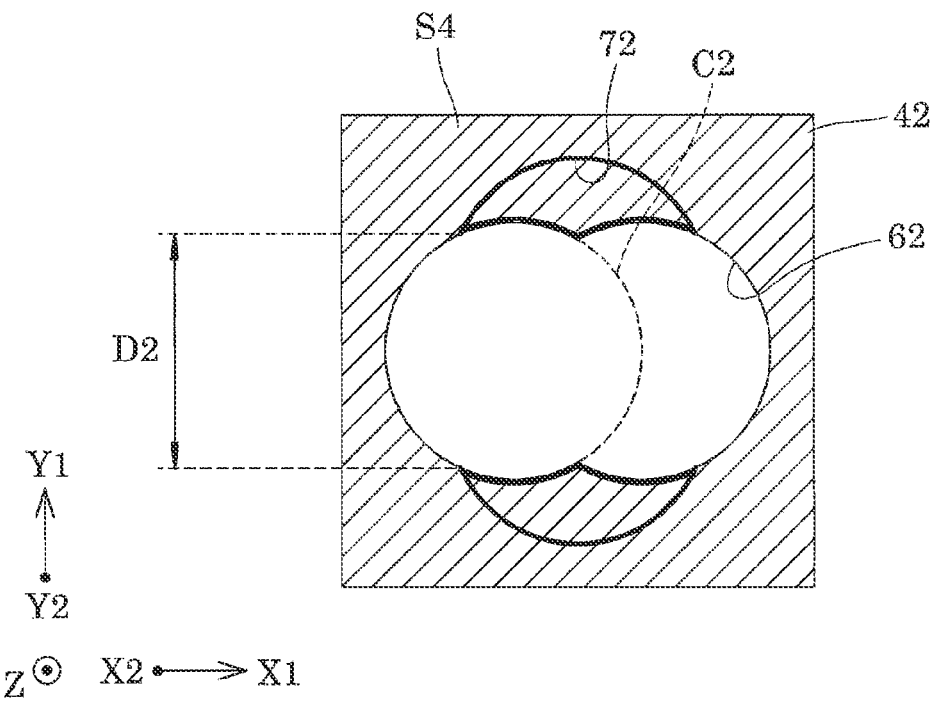
FIG. 14 is a plan view of a second filter plate constituting the filter member according to the fourth embodiment.
Figure 15:
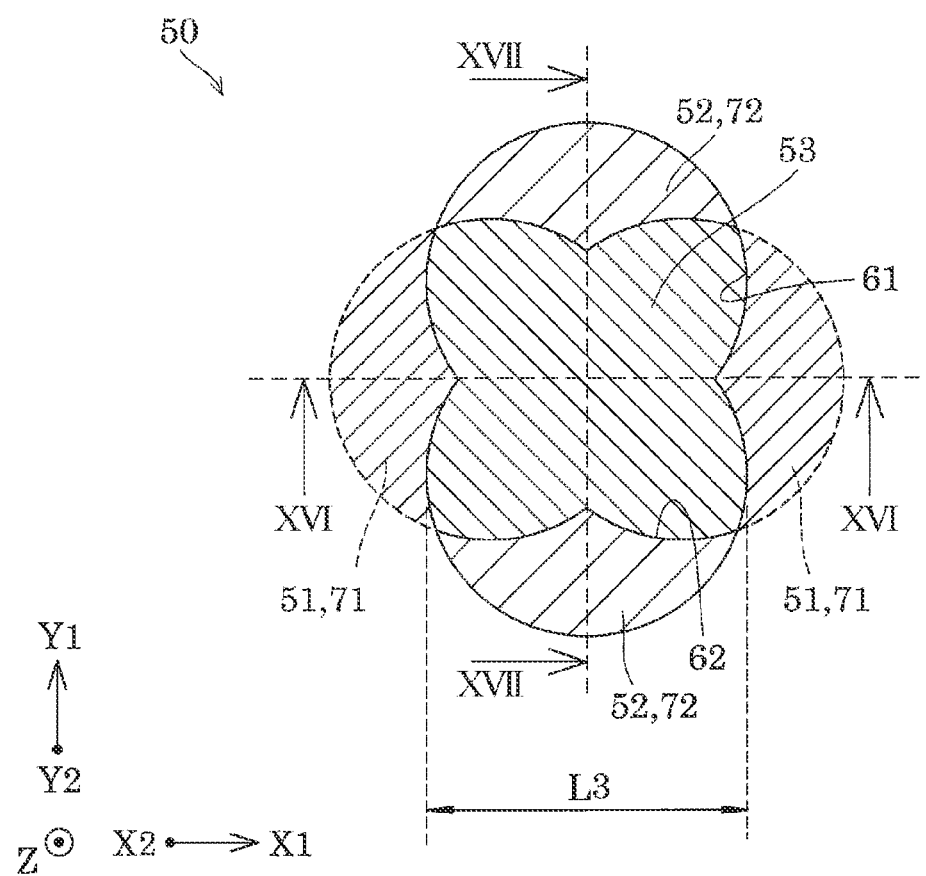
FIG. 15 is a plan view of a filter hole according to the fourth embodiment.
Figure 16:
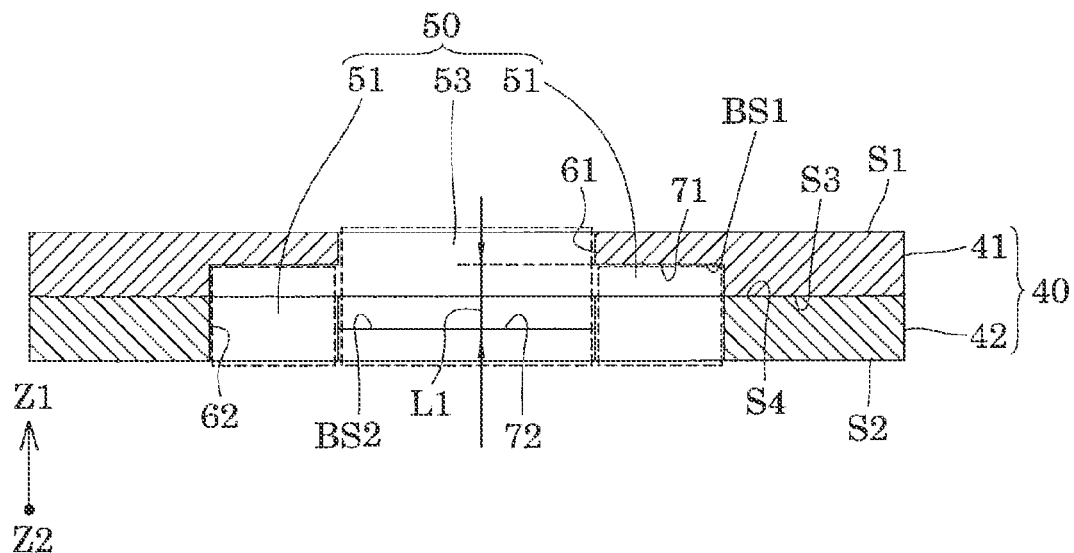
FIG. 16 is a cross-sectional view taken along line XVI-XVI in FIG. 15 according to the fourth embodiment.
Figure 17:
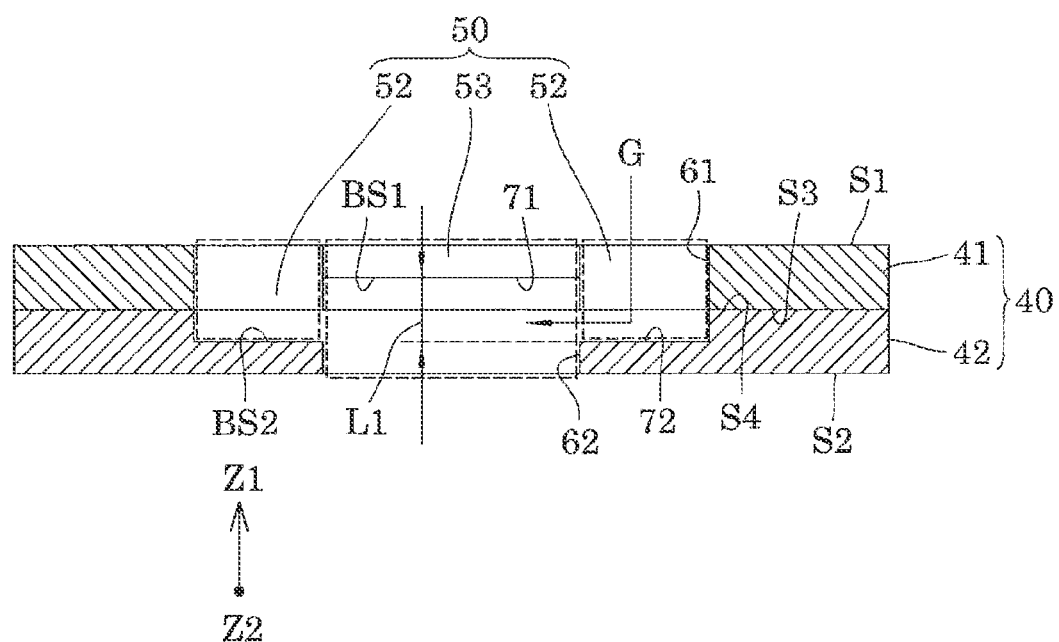
FIG. 17 is a cross-sectional view taken along line XVII-XVII in FIG. 15 according to the fourth embodiment.

FIG. 13 is a plan view of a first filter plate 41 constituting a filter member 40. FIG. 14 is a plan view of a second filter plate 42 constituting the filter member 40. FIG. 15 is a plan view of a filter hole 50. FIG. 16 is a cross-sectional view taken along line XVI-XVI in FIG. 15. FIG. 17 is a cross-sectional view taken along line XVII-XVII in FIG. 15. FIGS. 13 and 15 are enlarged views of one filter hole 50 provided in the filter member 40 and its surroundings. The penetrating portion 53, the first portion 51, and the second portion 52 are hatched in FIG. 15. The same members as those in the first embodiment are designated by the same reference numerals, and redundant descriptions will be omitted.

The filter member 40 of the present embodiment is configured by laminating the second filter plate 42 and the first filter plate 41 in the Z1 direction as a plurality of filter plates in this order, and has a plurality of filter holes 50 through which ink passes. In addition, the filter member 40 includes a first surface S1 facing the Z1 direction, which is the first direction, and a second surface S2 facing the Z2 direction opposite to the first direction.

The first filter plate 41 is formed with a first through-hole 61 and defines the first surface S1 of the filter member 40. In addition, a third surface S3 of the first filter plate 41 on the side opposite to the first surface S1 is defined. The second filter plate 42 is formed with a second through-hole 62 and defines the second surface S2 of the filter member 40. In addition, a fourth surface S4 of the second filter plate 42 on the side opposite to the second surface S2 is defined.

As illustrated in FIG. 2, the first filter plate 41 and the second filter plate 42 are formed in a long frame shape in the X direction in which the opening section 45 is provided. For example, by forming a frame-shaped member that is long in the X direction and having the opening section 45 penetrating in the Z direction in SUS, and providing Ni—Pd alloy plating on the surface of the member, the first filter plate 41 and the second filter plate 42 can be formed. Although the thicknesses of the first filter plate 41 and the second filter plate 42 are the same in the present embodiment, the thicknesses may be different.

In the first filter plate 41, a plurality of the first through-holes 61 penetrating in the Z direction are formed in the region R facing the manifold 130 in plan view when viewed in the Z1 direction. The first through-hole 61 of the present embodiment has a shape in which circular shapes having the same radius are overlapped with their centers shifted in the Y direction.

In the second filter plate 42, a plurality of the second through-holes 62 penetrating in the Z direction are formed in the region R facing the manifold 130 in plan view when viewed in the Z1 direction. The second through-hole 62 of the present embodiment has a shape in which circular shapes having the same radius are overlapped with their center shifted in the X direction.

In addition, the number and the disposition of the first through-holes 61 formed in the region R of the first filter plate 41 are not particularly limited. In the present embodiment, a predetermined number of the first through-holes 61 are formed at equal intervals along the X direction and the Y direction in the region R of the first filter plate 41. In addition, the number and the disposition of the second through-holes 62 formed in the region R of the second filter plate 42 are not particularly limited. In the present embodiment, a predetermined number of the second through-holes 62 are formed at equal intervals along the X direction and the Y direction in the region R of the second filter plate 42.

The filter hole 50 includes a first portion 51, a second portion 52, and a penetrating portion 53. The filter hole 50 is disposed such that the penetrating portion 53 is surrounded by the first portion 51 and the second portion 52.

The penetrating portion 53 is formed by overlapping the first through-hole 61 and the second through-hole 62. Specifically, in the filter member 40 in which the first filter plate 41 and the second filter plate 42 are laminated, the first through-hole 61 and the second through-hole 62 do not overlap completely and partially overlap in plan view when viewed in the Z1 direction. In this way, a portion where a part of the first through-hole overlaps with a part of the second through-hole 62 when viewed in the Z1 direction is a penetrating portion 53 that penetrates from the first surface S1 to the second surface S2 of the filter member 40.

The first portion 51 is a portion that is adjacent to the penetrating portion 53 and is recessed by more than half a thickness of the filter member 40 from the second surface S2 to the first surface S1 when the filter hole 50 is viewed in the Z1 direction. In the present embodiment, the first portion 51 is a portion adjacent to both the X1 direction side and the X2 direction side of the penetrating portion 53, and is composed of a portion of the second through-hole 62 other than the penetrating portion 53, and the first recessed section 71. The first portion 51 is recessed by the thickness of the first recessed section 71 rather than half the thickness of the filter member 40.

The second portion 52 is a portion that is adjacent to the penetrating portion 53 and is recessed by more than half a thickness of the filter member 40 from the first surface S1 to the second surface S2 when the filter hole 50 is viewed in the Z1 direction. In the present embodiment, the second portion 52 is a portion adjacent to both the Y1 direction side and the Y2 direction side of the penetrating portion 53, and is composed of a portion of the first through-hole 61 other than the penetrating portion 53, and the second recessed section 72. The second portion 52 is recessed by the thickness of the second recessed section 72 rather than half the thickness of the filter member 40.

The first recessed section 71 is formed in the first filter plate 41. Specifically, on the third surface S3 of the first filter plate 41, the first recessed section 71 that is adjacent to the first through-hole 61 and that overlaps with the second through-hole 62 when viewed in the Z1 direction, which is the first direction, is formed. The first recessed sections 71 are formed, one on the X1 direction side and one on the X2 direction side, from the penetrating portion 53. In addition, when viewed in the Z1 direction, a width of the first recessed section 71 in the Y direction is formed to be narrower than a width of the first through-hole 61.

Furthermore, the first recessed section 71 on the X1 direction side extends from the boundary with the first through-hole 61 in the X1 direction, and an end portion on the X1 direction side is formed in an arc shape to coincide with the second through-hole 62. Similarly, the first recessed section 71 on the X2 direction side extends from the boundary with the first through-hole 61 in the X2 direction, and an end portion on the X2 direction side is formed in an arc shape to coincide with the second through-hole 62. In the present embodiment, two first recessed sections 71 have a shape that is a mirror image in the Y direction in plan view viewed in the Z1 direction, but the shape is not limited to such a shape.

The second recessed section 72 is formed in the second filter plate 42. Specifically, on the fourth surface S4 of the second filter plate 42, a second recessed section 72 that is adjacent to the second through-hole 62 and overlaps with the first through-hole 61 when viewed in the Z1 direction, which is the first direction, is formed. The second recessed sections 72 are formed, one on the Y1 direction side and one on the Y2 direction side, from the penetrating portion 53. In addition, when viewed in the Z1 direction, a width of the second recessed section 72 in the X direction is formed to be narrower than a width of the second through-hole 62.

Furthermore, the second recessed section 72 on the Y1 direction side extends from the boundary with the second through-hole 62 in the Y1 direction, and an end portion on the Y1 direction side is formed in an arc shape to be in contact with the first through-hole 61. The second recessed section 72 on the Y2 direction side extends from the boundary with the second through-hole 62 in the Y2 direction, and an end portion on the Y2 direction side is formed in an arc shape to be in contact with the first through-hole 61. In the present embodiment, two second recessed sections 72 have a shape that is a mirror image in the X direction in plan view viewed in the Z1 direction, but the shape is not limited to such a shape.

As described above, the entire first recessed section 71 overlaps with the second through-hole 62 when viewed in the Z1 direction. In addition, the entire second recessed section 72 overlaps with the first through-hole 61 when viewed in the Z1 direction. Of course, the first recessed section 71 and the second recessed section 72 are not limited to such a configuration. A part of the first recessed section 71 may not overlap with the second through-hole 62 when viewed in the Z1 direction, and may extend outside the second through-hole 62. Similarly, a part of the second recessed section 72 may not overlap with the first through-hole 61 when viewed in the Z1 direction, and may extend outside the first through-hole 61.

The first filter plate 41 and the second filter plate 42 are laminated such that the third surface S3 and the fourth surface S4 are in contact with each other. The first filter plate 41 and the second filter plate 42 are integrated through adhesion with an adhesive or bonding.

By laminating the first filter plate 41 and the second filter plate 42, a part of the first through-hole 61 and a part of the second through-hole 62 overlap with each other to form the penetrating portion 53. In addition, the first portion 51 is formed of the first recessed section 71 and a portion of the second through-hole 62 other than the penetrating portion 53.

The second portion 52 is formed of the second recessed section 72 and a portion of the first through-hole 61 other than the penetrating portion 53. In this way, the filter hole 50 in which the penetrating portion 53 is disposed is formed between the two first recessed sections 71 in the X1 direction and is formed between the two second recessed sections 72 in the Y1 direction.

The filter hole 50 of the present embodiment is defined by one first through-hole 61 and one second through-hole 62 communicating with each other.

Although the plurality of filter holes 50 are formed in the region R of the filter member 40 facing the manifold 130, the individual filter holes 50 may have different shapes.

Although the plurality of filter holes 50 formed in the region R are all illustrated to have the same shape, the present disclosure is not limited thereto, and the plurality of filter holes 50 may have different shapes.

When viewed in the Z2 direction, a diameter of the maximum inscribed circle inscribed in the first through-hole 61 is defined as D1. In the present embodiment, the first through-hole 61 has a shape in which two circular shapes having the same radius are overlapped with their centers shifted in the Y direction. Therefore, the maximum inscribed circle C1 has the same shape as one of the original circular shapes, and the diameter of the circular shape is the diameter D1 of the maximum inscribed circle inscribed in the first through-hole 61.

When viewed in the Z1 direction, a diameter of the maximum inscribed circle inscribed in the second through-hole 62 is defined as D2. In the present embodiment, the second through-hole 62 has a shape in which two circular shapes having the same radius are overlapped with their centers shifted in the X direction. Therefore, the maximum inscribed circle C2 has the same shape as one of the original circular shapes, and the diameter of the circular shape is the diameter D2 of the maximum inscribed circle inscribed in the second through-hole 62.

In the present embodiment, as the first through-hole 61 and the second through-hole 62 that are not circular, a shape in which two circular shapes overlap with each other is exemplified, but the shape is not limited thereto. The first through-hole 61 and the second through-hole 62 can have any opening shape that can define the maximum inscribed circle, such as a rectangular shape or an elliptical shape.

In addition, when viewed in the Z1 direction, a diameter of the maximum inscribed circle inscribed in the nozzle 21 (not illustrated) is defined as DN. The shape of the nozzle 21 when viewed in the Z1 direction is not limited to a circular shape, and can be any opening shape that can define the maximum inscribed circle.

Although there is no restriction on the magnitude relationship between the diameter D1, the diameter D2, and the diameter DN, it is preferable that both the diameter D1 and the diameter D2 are smaller than the diameter DN. By making the diameter D1 and the diameter D2 smaller than the diameter DN of the nozzle 21 in this way, smaller foreign substances in the ink can be captured and the number of filter holes 50 per unit area can be increased. Therefore, it is possible to reduce the pressure loss of the ink passing through the filter member 40. Of course, the diameter D1 or/and the diameter D2 may be larger than the diameter DN of the nozzle 21.

A distance between the bottom surface BS1 of the first recessed section 71 and the bottom surface BS2 of the second recessed section 72 with respect to the Z1 direction is defined as L1. In the present embodiment, as illustrated in the cross-sectional view taken along line XVI-XVI in FIG. 16, the distance L1 is a distance between the bottom surface BS1 of the first recessed section 71 and the bottom surface BS2 of the second recessed section 72 with respect to the Z1 direction. When the bottom surface BS1 of the first recessed section 71 and the bottom surface BS2 of the second recessed section 72 are not flat, the maximum distance between the bottom surface BS1 of the first recessed section 71 and the bottom surface BS2 of the second recessed section 72 with respect to the Z1 direction is defined as L1. In addition, the maximum width of the penetrating portion 53 is L3. In the present embodiment, the width with respect to the X1 direction is the same as the width with respect to the Y1 direction, which is the maximum width.

The distance L1 is smaller than the distance L3. By making the distance L1 smaller than the distance L3 in this way, as illustrated by an arrow G in FIG. 17, it is possible to facilitate capturing the foreign substance that is about to flow into the penetrating portion 53 from the second portion 52.

As described above, the recording head 2 according to the present embodiment is different from the recording head 2 according to the first embodiment in that the first through-hole 61 and the second through-hole 62 are not circular, but it has the same actions and effects as the recording head 2 of the first embodiment.

Other Embodiments

In the above-described embodiment, an ink jet recording head is described as an example of a liquid ejecting head. However, the present disclosure is intended for a wide range of liquid ejecting heads, and can also be applied to a liquid ejecting head that discharges a liquid other than ink. Other liquid ejecting heads include, for example, various recording heads used in image recording apparatuses such as printers, coloring material ejecting heads used in manufacturing color filters such as liquid crystal displays, electrode material ejecting heads used for electrode formation such as organic EL displays and field emission displays (FEDs), and bioorganic material ejecting heads used for bio-chip manufacturing, and the present disclosure can also be applied to liquid ejecting apparatuses including such liquid ejecting heads.

In the above-described embodiment, the piezoelectric actuator is described as a driving element that causes the pressure change in the pressure chamber, but the pressure disclosure is not particularly limited thereto.

It is needless to say that the present disclosure is not limited to the embodiments. As a matter of course for those skilled in the art, it is disclosed as an embodiment of the present disclosure that the mutually replaceable members and configurations disclosed in the embodiments are appropriately replaced and the combination thereof is changed and applied, although not disclosed in the examples, members and configurations, which are known techniques and are mutually replaceable with the members and the configurations disclosed in the embodiments, are appropriately replaced and the combination thereof is changed and applied, and although not disclosed in the embodiments, members and configurations that can be assumed as a substitute for the members and configurations disclosed in the embodiments by those skilled in the art based on the known techniques, are appropriately replaced and the combination thereof is changed and applied.

What is claimed is:

1. A liquid ejecting head comprising:
   a nozzle configured to eject a liquid; and
   a filter member that includes filter plates laminated in a first direction and that has filter holes through which a liquid supplied to the nozzle passes, wherein
   the filter member includes a first surface and a second surface facing opposite directions with respect to the first direction,
   the filter plates include a first filter plate at which a first through-hole is formed and defining the first surface, and a second filter plate at which a second through-hole is formed and defining the second surface, and
   the filter hole includes a penetrating portion that is a portion where a part of the first through-hole overlaps with a part of the second through-hole when viewed in the first direction, and that penetrates from the first surface to the second surface, and a first portion adjacent to the penetrating portion and recessed by more than half a thickness of the filter member from the second surface to the first surface when viewed in the first direction.

2. The liquid ejecting head according to claim 1, wherein
   the filter hole includes a second portion adjacent to the penetrating portion and recessed by more than half the thickness of the filter member from the first surface to the second surface when viewed in the first direction, and
   the penetrating portion is disposed between the first portion and the second portion with respect to a second direction orthogonal to the first direction.

3. The liquid ejecting head according to claim 2, wherein
   the filter member further includes a third filter plate at which a third through-hole is formed and sandwiched between the first filter plate and the second filter plate, and
   when viewed in the first direction, the third through-hole has a portion that overlaps with the first through-hole and the second through-hole, a portion that overlaps with the second through-hole but does not overlap with the first through-hole, and a portion that overlaps with the first through-hole but does not overlap with the second through-hole.

4. The liquid ejecting head according to claim 3, wherein
   a thickness of the third filter plate is thicker than a thickness of the first filter plate and a thickness of the second filter plate.

5. The liquid ejecting head according to claim 3, wherein one filter hole is defined by one first through-hole, one second through-hole, and one third through-hole communicating with each other.

6. The liquid ejecting head according to claim 3, wherein
an entire portion of the third through-hole on one side of the second direction with respect to the penetrating portion overlaps with the second through-hole when viewed in the first direction, and
an entire portion of the third through-hole on another side of the second direction with respect to the penetrating portion overlaps with the first through-hole when viewed in the first direction.

7. The liquid ejecting head according to claim 3, wherein a diameter of a maximum inscribed circle inscribed in the first through-hole is smaller than a diameter of a maximum inscribed circle inscribed in the nozzle.

8. The liquid ejecting head according to claim 3, wherein a shortest distance between a bottom surface of the first portion and a bottom surface of the second portion is smaller than a diameter of a maximum inscribed circle inscribed in the first through-hole in a cross section obtained by cutting the filter member along the first direction and the second direction at a position where a width of the penetrating portion with respect to the second direction is maximum.

9. The liquid ejecting head according to claim 3, wherein
a diameter of a maximum inscribed circle inscribed in the first through-hole is smaller than a diameter of a maximum inscribed circle inscribed in the nozzle, and
a shortest distance between a bottom surface of the first portion and a bottom surface of the second portion is smaller than the diameter of the maximum inscribed circle inscribed in the first through-hole in a cross section obtained by cutting the filter member along the first direction and the second direction at a position where a width of the penetrating portion with respect to the second direction is maximum.

10. The liquid ejecting head according to claim 3, wherein a dimension of the third through-hole with respect to the first direction is smaller than a maximum width of the penetrating portion with respect to the second direction.

11. The liquid ejecting head according to claim 1, wherein
the first filter plate defines a third surface on a side opposite to the first surface,
the second filter plate defines a fourth surface on a side opposite to the second surface,
the first filter plate and the second filter plate are laminated such that the third surface and the fourth surface are in contact with each other, and
the third surface of the first filter plate is formed with a first recessed section that is adjacent to the first through-hole and that overlaps with the second through-hole when viewed in the first direction.

12. The liquid ejecting head according to claim 11, wherein
the fourth surface of the second filter plate is formed with a second recessed section that is adjacent to the second through-hole and that overlaps with the first through-hole when viewed in the first direction, and
the penetrating portion is disposed between the first recessed section and the second recessed section with respect to a second direction orthogonal to the first direction.

13. The liquid ejecting head according to claim 12, wherein
an entire first recessed section overlaps with the second through-hole when viewed in the first direction, and
an entire second recessed section overlaps with the first through-hole when viewed in the first direction.

14. The liquid ejecting head according to claim 12, wherein
a shortest distance between a bottom surface of the first recessed section and a bottom surface of the second recessed section is smaller than a diameter of a maximum inscribed circle inscribed in the first through-hole in a cross section obtained by cutting the filter member along the first direction and the second direction at a position where a width of the penetrating portion with respect to the second direction is maximum.

15. The liquid ejecting head according to claim 12, wherein
a diameter of a maximum inscribed circle inscribed in the first through-hole is smaller than a diameter of a maximum inscribed circle inscribed in the nozzle, and
a shortest distance between a bottom surface of the first recessed section and a bottom surface of the second recessed section is smaller than the diameter of the maximum inscribed circle inscribed in the first through-hole in a cross section obtained by cutting the filter member along the first direction and the second direction at a position where a width of the penetrating portion with respect to the second direction is maximum.

16. The liquid ejecting head according to claim 12, wherein
a distance between a bottom surface of the first recessed section and a bottom surface of the second recessed section with respect to the first direction is smaller than a maximum width of the penetrating portion with respect to the second direction.

17. The liquid ejecting head according to claim 11, wherein
a diameter of a maximum inscribed circle inscribed in the first through-hole is smaller than a diameter of a maximum inscribed circle inscribed in the nozzle.

18. A liquid ejecting apparatus comprising:
a liquid ejecting head having a nozzle that ejects a liquid; and
a filter member that includes filter plates laminated in a first direction and that has filter holes through which a liquid supplied to the liquid ejecting head passes, wherein
the filter member includes a first surface and a second surface facing opposite directions with respect to the first direction,
the filter plates include a first filter plate at which a first through-hole is formed and defining the first surface, and a second filter plate at which a second through-hole is formed and defining the second surface, and
the filter hole includes a penetrating portion that is a portion where a part of the first through-hole overlaps with a part of the second through-hole when viewed in the first direction, and that penetrates from the first surface to the second surface, and a first portion adjacent to the penetrating portion and recessed by more than half a thickness of the filter member from the second surface to the first surface when viewed in the first direction.

19. A filter member comprising:
filter plates laminated in a first direction; and
filter holes through which a liquid passes, wherein the filter member includes a first surface and a second surface facing opposite directions with respect to the first direction, the filter plates include a first filter plate at which a first through-hole is formed and defining the first surface, and a second filter plate at which a second through-hole is formed and defining the second surface, and the filter hole includes a penetrating portion that is a portion where a part of the first through-hole overlaps with a part of the second through-hole when viewed in the first direction, and that penetrates from the first surface to the second surface, and a first portion adjacent to the penetrating portion and recessed by more than half a thickness of the filter member from the second surface to the first surface when viewed in the first direction.

* * * * *